United States Patent
Ostadan

(10) Patent No.: US 11,719,837 B2
(45) Date of Patent: Aug. 8, 2023

(54) METHODS FOR REDUCING INTENSITY OF SEISMIC MOTION AT OR NEAR THE GROUND SURFACE

(71) Applicant: Isatis LLC, Oakland, CA (US)

(72) Inventor: Farhang Ostadan, Oakland, CA (US)

(73) Assignee: Isatis LLC, Oakland, CA (US)

( * ) Notice: Subject to any disclaimer, the term of this patent is extended or adjusted under 35 U.S.C. 154(b) by 625 days.

(21) Appl. No.: 16/727,515

(22) Filed: Dec. 26, 2019

(65) Prior Publication Data
US 2021/0199824 A1  Jul. 1, 2021

(51) Int. Cl.
G01V 1/00    (2006.01)
G01V 1/30    (2006.01)

(52) U.S. Cl.
CPC .............. G01V 1/008 (2013.01); G01V 1/306 (2013.01)

(58) Field of Classification Search
None
See application file for complete search history.

(56) References Cited

U.S. PATENT DOCUMENTS

| | | | | |
|---|---|---|---|---|
| 3,228,470 A * | 1/1966 | Papaila | ............... | E21B 43/32 |
| | | | | 166/250.1 |
| 6,792,720 B2 * | 9/2004 | Hocking | ............... | G01V 1/008 |
| | | | | 52/741.11 |
| 7,331,143 B2 * | 2/2008 | Hocking | ............... | E02D 3/11 |
| | | | | 52/741.11 |
| 11,204,435 B1 * | 12/2021 | Thompson | ............... | G01V 1/008 |
| 2004/0045230 A1 * | 3/2004 | Hocking | ............... | G01V 1/008 |
| | | | | 52/167.1 |
| 2005/0016119 A1 * | 1/2005 | Hocking | ............... | G01V 1/008 |
| | | | | 52/741.1 |
| 2016/0139588 A1 * | 5/2016 | Huang | ............... | G05B 19/19 |
| | | | | 700/275 |

FOREIGN PATENT DOCUMENTS

| | | | | |
|---|---|---|---|---|
| CA | 2497398 C | * | 4/2009 | ............ E02D 27/34 |
| CH | 689191 A5 | * | 11/1998 | ............ G01P 1/023 |
| CN | 111399035 A | * | 7/2020 | |

(Continued)

OTHER PUBLICATIONS

Ferritto, John M. Seismic Design Criteria for Soil Liquefaction. Naval Facilities Engineering Service Center Port Hueneme CA, 1997. (Year: 1997).*

(Continued)

*Primary Examiner* — Isam A Alsomiri
*Assistant Examiner* — Jonathan D Armstrong
(74) *Attorney, Agent, or Firm* — Dergosits & Noah LLP

(57) ABSTRACT

Systems and methods provide for the reduction of motion at a ground layer of a site due to a seismic event. A predicted seismic motion is obtained for a geological layer at depth and properties of the layers between the ground layer and layer at depth are determined. A model is created using the layers and the predicted seismic motion. Iteratively for each layer, one or more properties of the layer is changed in the model and a site amplification is performed to determine a change or changes that result in an acceptable response at the ground layer. Subsequently, the in situ layer may be modified according to the modified property or properties to reduce motion at the site due to a seismic event.

21 Claims, 12 Drawing Sheets

(56) References Cited

FOREIGN PATENT DOCUMENTS

| | | | | |
|---|---|---|---|---|
| JP | 2005538277 A | * | 12/2005 | |
| JP | 4111952 B2 | * | 7/2008 | ............. E02D 27/34 |
| JP | 5526290 B1 | * | 6/2014 | ............... G01N 1/04 |
| WO | WO-2004022865 A2 | * | 3/2004 | ............. E02D 27/34 |
| WO | WO-2020127302 A1 | * | 6/2020 | |

OTHER PUBLICATIONS

Bouckovalas, G. D., and Y. Z. Tsiapas. "Seismic isolation effects and elastic response spectra of liquefied ground." 6th International Conference on Earthquake Geotechnical Engineering. 2015. (Year: 2015).*

Bouckovalas, George D., et al. "Ground response at liquefied sites: seismic isolation or amplification?." Soil Dynamics and Earthquake Engineering 91 (2016): 329-339. (Year: 2016).*

Zhou, Yanguo, et al. "Shear wave velocity-based evaluation and design of stone col. improved ground for liquefaction mitigation." Earthquake Engineering and Engineering Vibration 16.2 (2017): 247-261. (Year: 2017).*

Elkhoraibi, Tarek, and Alidad Hashemi. "Account for Uncertainty in the Context of Seismic Site Response Analysis." (2013). (Year: 2013).*

Farhang Ostadan, "A System for Analysis of Soil-Structure Interaction, User's Manual, Revision 2," SASSI 2000, Jan. 2006, 345 pages.

Schnabel et al., "Shake, A Computer Program for Earthquake Response Analysis of Horizontally Layered Sites," Earthquake Engineering Research Center, Report No. EERC 72-12, Dec. 1972, 114 pages.

Farhang Ostgadan, "A System for Analysis of Soil-Structure Interaction, Revision 2, Theoretical Manual," SASSI 2000, Jan. 2006, 191 pages.

PCT/US20/65040 International Search Report and Written Opinion.

Benjumea, et al. "Characterization of a complex near-surface structure using well logging and passive seismic measurements" Solid Earth, 7, 685-701, 2016, 17 pages.

* cited by examiner

METHODS FOR REDUCING INTENSITY OF SEISMIC MOTION AT OR NEAR THE GROUND SURFACE

TECHNICAL FIELD

The subject matter relates to the field of site preparation, and more particularly to systems and methods for reducing the response of a site to a seismic event.

BACKGROUND

An earthquake (EQ) starts from rupturing rock at depth at a point called the hypocenter. For shallow EQs (e.g., those in California) the depth is in the range of 10 to 20 miles below the surface. In other areas the depth of the epicenter may be 100 miles or more.

Once the rock at depth starts rupturing, the rupture rapidly expands on a seismic fault plane. For small EQs, the fault plane that ruptures is a small plane. For large EQs, the fault plane mat be 10 to more than 100 miles long, depending on the magnitude of the EQ. Magnitude is also a function of other parameters, but it represents the energy released by the EQ. Between the time the rupture of the rock starts and stops (few seconds to over 60 seconds) seismic waves are triggered and travel in all directions. As seismic waves approach the ground surface, they have to pass through the intervening rock and soil layers, which usually include softer rock and even softer soil. As a result, the seismic waves are amplified as they approach the surface.

For characterizing the seismic site amplification effect, the best geotechnical mechanical parameter is a measurement of the softness or stiffness of a layer (of, e.g., a soil or rock layer) and is best represented by the "seismic shear wave velocity" (SSWV) of the site layers. SSWV represents how fast a seismic shear wave (the most destructive EQ waves) can travel in the geologic medium. For soil, the SSWV is typically in the range of a few hundred ft/sec to 2,000 ft/sec and for rock it ranges from about 2,000 ft/sec for soft rock to over 10,000 ft/sec for hard rock. There are well established geophysical methods and techniques for measuring the soil and rock velocities.

The intensity of the motion at any given site (what humans feel and what buildings experience as ground shaking level) is a function of: EQ magnitude, the distance of the EQ epicenter to the site, and the site's SSWV profile (which reflects the amplification level).

For example, the 1989 Loma Prieta EQ near San Francisco was caused by a fault about 70 miles away in the Santa Cruz area. The EQ had a magnitude close to magnitude 7 but the site amplification in the San Francisco area was significant due to soft soil being present in many parts of the city. As a result, the damage was sizable which included widespread liquefaction, e.g., in the Marina district of San Francisco many residences were severely damaged. However, despite being subjected to the same event and being even closer to the hypocenter, there were many cities between Santa Cruz and San Francisco that had little to no damage mainly due to absence of significant site amplification.

Liquefaction, in fact, is known to be one of the costliest sources of damage due to EQs worldwide. The most recent earthquakes in Christchurch, New Zealand demonstrate the extent of liquefaction damage for a modern urban area.

The lessons learned from each earthquake event are often incorporated in codes and standards to enhance seismic safety. However, there are often numerus structures that do not meet the current design standards and the cost for their seismic upgrade is prohibitive. And, in congested urban areas, the behavior and potential collapse of any nearby structure imposes a significant risk on the structure of interest even if the target structure has been upgraded for seismic safety.

The potential damage from an EQ, which includes casualties, damage to facilities, and the interruption of economic activities, is enormous. Science as of now is not capable of predicting the timing of the next big event, but science is able to postulate the probability of a major event within the next 20 to 30 years in seismically active regions. For example, the United States Geological Survey (USGS) assigns a probability of 60% for an earthquake measuring 6.7 in the Los Angeles area in the next 30 years. For the same size event within the same time window, the San Francisco Bay area has a probability of 72%. And around the world, billions of people live with the daily threat of earthquakes. According to a 2017 study conducted by the European Union, the total world population living in seismic areas has increased by 93 percent to 2.7 billion people in the past 40 years.

However, while the prediction of seismic motion intensity for the design of structures has improved over the years, the prediction of seismic motion still suffers from a large uncertainty. In addition, some seismic faults are unknown (blind faults) and are only discovered after they rupture.

Thus, there is a need to reduce and potentially eliminate the impact of an EQ. This need is increased by the fact that major events repeat in time depending on the return period associated with a seismic fault.

To eliminate the impact of an EQ, there are currently several types of isolation devices (e.g., base isolation, sliding friction pendulum systems, etc.) that may be added as mechanical devices to the structure (at the foundation level or at a higher elevation in the structure), which effectively change the natural frequency of the structure to a much lower frequency where the intensity of ground motion is much less. However, such devices are not effective in the vertical direction because they do not isolate the structure from vertical ground shaking motions. Base isolation also requires a dual foundation making the design expensive and impractical for embedded or partly embedded structures. For these reasons such devices are rarely used in practice and very seldom adopted for critical facilities, such as nuclear facilities. It should be noted that the seismic isolation devices do not change the intensity of the ground motion but will modify the dynamic behavior of the structure and reduce the intensity of structural horizontal responses during the earthquake event.

Currently the industry approach for developing seismic design motion for a structure and the qualification of equipment in the structure for seismic safety involves a multi-step process. The process effectively provides the design intensity of the ground motions for the location of the structure as a function of the safety classification (or the performance goal) of the structure and its contents. For example, for the building industry, the intensity level adopted for a design is based on the 475-year earthquake with the requirement that the building should not collapse due to the 475-year event but may experience significant damage. For critical facilities, the intensity levels range between 2,500-year to 10,000-year events, depending on the facility, and due to the greater risk associated with the failure of such critical facilities.

For EQ design, in practice two groups of structures are encountered. Group 1 includes: buildings that are used for office and residential use or light industry application;

buildings in university campuses and hospitals and other industrial use; and almost all buildings in urban areas. These buildings follow the building code requirements in each country. In the USA, ASCE 7-16 is the latest code of practice for design. ASCE 7-16 refers to a national seismic map that is periodically updated by the United States Geological Survey (USGS). These maps provide the design motion depending on the building site location and geotechnical properties of the site. For some applications and depending on site conditions (mostly soft soil sites), ASCE 7-16 requires performing a site amplification to evaluate the effect of local site conditions on the intensity of the ground motion. In all site conditions (soft to stiff soil sites), designers are permitted to perform site-specific seismic site amplification analysis and develop a more accurate site-specific design motion for a design application. In some situations, a facility needs to be evaluated for a specific scenario, e.g., an EQ caused by specific seismic event. For these cases, the rock motion can be obtained for the specific event and used in site amplification analysis.

Group 2 includes critical facilities whose failure may have serious and long-lasting impact on employees in the facility and on the nearby regions, or have a very large economic impact on the society. Examples of such facilities include: nuclear facilities, large dams, petrochemical facilities, etc. Such facilities are designed to higher level standards that allow a much lower level of risk for failure. For Group 2 structures, ground motions are developed by a group of experts in the geoscience practice (e.g., seismologist, geotechnical engineers, geologists, volcanologist, etc.) following a formal process known as Senior Seismic Hazard Advisory Committee (SSHAC). The regulated SSHAC process is defined in numerous U.S. Nuclear Regulatory Commission publications and must be followed for major seismic studies in USA. SSHAC is also often is used in other countries. The SSHAC process is a multiyear process that provides the seismic motion typically at a depth corresponding to a competent rock layer at the site. For example, in a site profile with soil on the top, the search is for a competent rock layer at depth and SSHAC process defines the motion for that rock layer. Following this step, in a second step known as "site amplification," geotechnical engineers determine how a seismic motion (e.g., the intensity of the rock motion) at the rock layer at depth is amplified as the motion propagates towards the surface (or near the surface, e.g., the foundation depth of the structure) where the amplified seismic motion with higher intensity will be applied to structural analysis for design. Depending on the site geology and properties, the site amplification may predict surface motion that is significantly different from the motion of the rock layer at depth, e.g., showing amplification at some frequencies and de-amplification at other frequencies. The surface motion predicted by site amplification is used for structural analysis in the design of the structure and the development of predicted structural response motion at the locations of critical equipment in the structure for design of the safety related equipment.

In practice, the site amplification analysis starts with developing a model of the site layer by layer. The model extends from the depth of the competent rock horizon (i.e., a layer at depth) where the seismic motion is defined by the SSHAC process or selected from the national seismic maps to the surface (or near the surface, e.g., the foundation depth of the structure). The process is well established in practice and is based on either a one-dimensional, or occasionally a two- and three-dimensional model of the site to compute the ground surface motion. For a one-dimensional analysis, the most widely used computer program is the program developed in the University of California, Berkeley called SHAKE ("SHAKE—A Computer Program for Earthquake Response Analysis of Horizontally Layered Sites," Schnabel, P. B., Lysmer, J. and Seed, H. B., 1972; "SHAKE—A computer program for earthquake analysis of horizontally layered sites," Earthquake Engineering Research Center, University of California, Berkeley, Report No. EERC 72-12). There are numerous versions of SHAKE currently available in the industry with enhanced features. For two-dimensional or three-dimensional site amplification analysis, there is another program from the University of California, Berkeley called SASSI ("SASSI2000-A System for Analysis of Soil-Structure Interaction," Ostadan, F.; Chin, C.; Lysmer, J. (1999), University of California, Berkeley, Calif., USA an Improved Version of original SASSI, Lysmer et al. (1981), Report UCB/GT/81-02, Geotechnical Engineering, University of California, Berkeley, April 1981). Discussion of aspects of a site amplification analysis are discussed within.

The key input for a site amplification is the predicted rock motion at depth as discussed above and the dynamic properties for each layer (e.g., soil or rock) in the site model. Measurement of dynamic soil and rock properties has also evolved and there are numerous geophysical techniques that are commonly used to obtain the dynamic properties. Some techniques require boring and measurement within boring. Others can take measurements from the ground surface without boring. For critical facilities, the geotechnical field and laboratory investigations are very extensive and result in a wide range of geotechnical data, including the dynamic site properties that are used for site amplification modeling and analysis.

BRIEF SUMMARY

In embodiments, a method may reduce the intensity of ground motion at a building site that results from a seismic event. In an embodiment, in a design phase, analytical methods are used to develop a profile of the site from a layer at depth to a layer at or near the surface. The profile may be used to determine an intervening layer and a modification to the intervening layer that results in a reduction of the predicted ground motion. In the embodiment, in a construction phase, the intervening layer may be modified as determined by the design phase. In an embodiment, a plurality of layers may be modified to obtain a greater reduction in the intensity of ground motion. In an embodiment, a limited thickness of a layer may be modified. In an embodiment, a layer may be thick enough that that single very thick layer may be modified at two different depths. In an embodiment, more than one layer (i.e., different depths) may be modified.

BRIEF DESCRIPTION OF THE DRAWINGS

The embodiments are illustrated by way of example and not limitation in the figures of the accompanying drawings, in which like references indicate similar elements, and in which.

DETAILED DESCRIPTION

Figure 1:
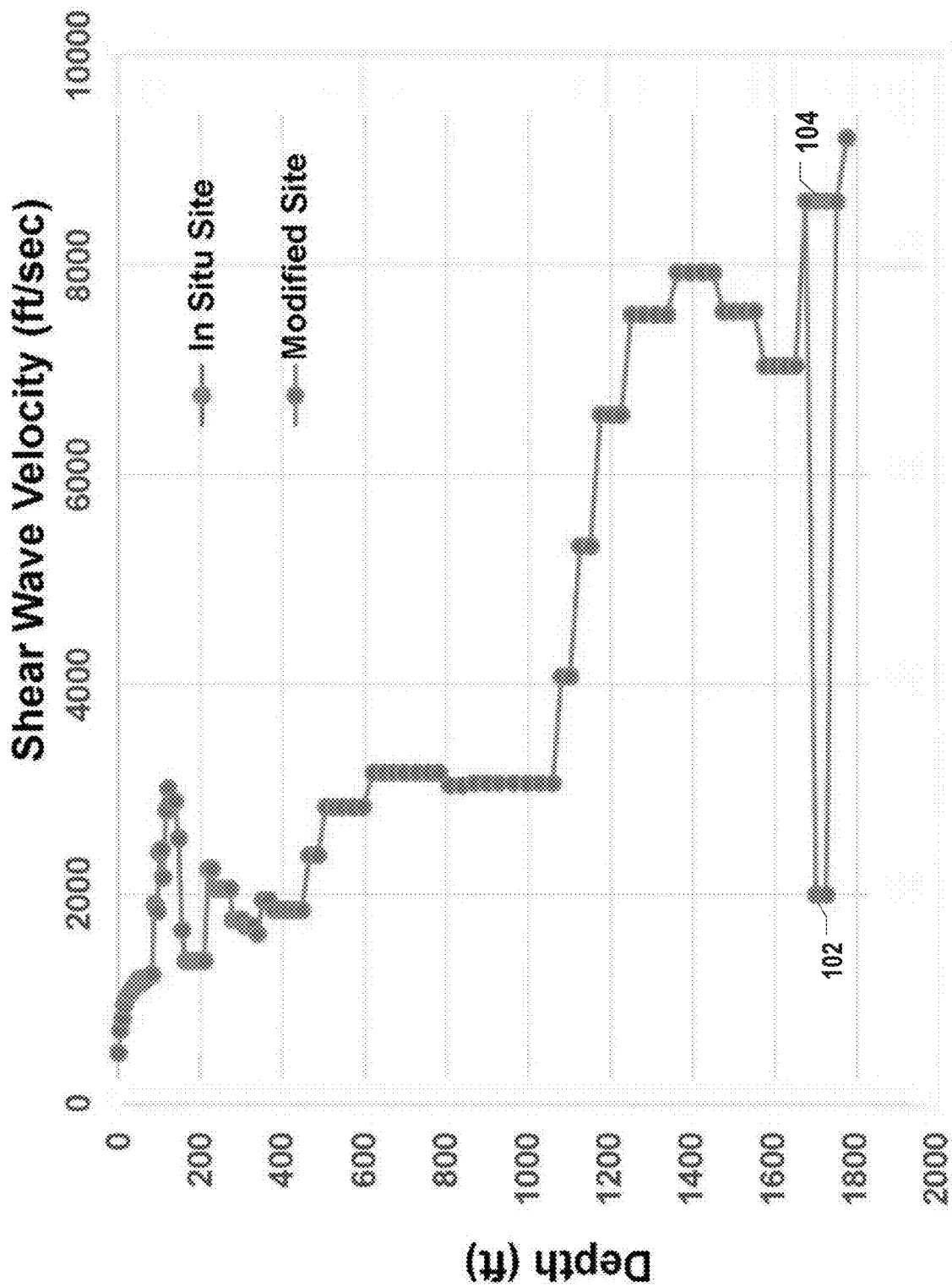
FIG. 1 is a chart illustrating the shear wave velocities of an in situ site and a modified site.

In embodiments, a Seismic Site Isolation (SSI) technology reduces seismic ground motion intensity at or near the ground surface to improve the seismic safety of structures. In embodiments, the SSI technology also reduces the seismic stresses in the soil layers to reduce the intensity of the ground shaking and also reduce or even eliminate the liquefaction risk. Embodiments of the SSI technology may be effective for facilities with multiple structures, areas with closely spaced buildings such as most urban areas, underground structures such as tunnels and stations, utility and communication lines at or below the ground surface, almost all critical facilities with safety equipment requiring seismic analysis and design, and soil site areas with liquefaction potentials. Embodiments of SSI technology may use or adapt currently used methodologies to evaluate seismic site amplification and also widely used techniques to characterize the site properties for modeling and site amplification analysis. In embodiments, an SSI design phase may employ an iterative analytical process that may be used to determine a depth of one or multiple layers of a site profile and determine how the one or multiple layers should be modified to provide the most reduction in site amplification and seismic stresses in the soil layers. After the SSI design phase, an SSI construction phase may employ available construction techniques for site modification. The SSI construction phase may also employ currently available geophysical techniques to measure the properties of the modified soil layer to ensure it is within the range defined range in the SSI design phase.

In the field, a "layer" may loosely describe each rock or soil type beneath a site. For example, a site may have a sand layer at top, a gravel layer below it, a clay layer below gravel, then soft rock layer, then hard rock layer, etc. In computer modeling associated with embodiments for a site, each layer, say a gravel layer, may be modeled by half dozen sub-layers for a more accurate numerical analysis.

In an embodiment, a method provides the basis for designing and implementing the physical modification of one or more specific layers at depth to reduce how a seismic event would be experienced at, or near, the surface by a structure. In an embodiment, a goal of the modification is to reduce the site's ground motion intensity at a frequency range of interest at or near the ground surface. In an embodiment, a goal of the modification is to reduce seismic stresses in the soil layers. And in an embodiment, a goal of the modification may be to reduce both the ground motion intensity at a frequency range of interest and reduce seismic stresses in the soil layers. In an embodiment, a goal of the modification is to modify the site's mechanical properties and specifically the site's shear wave velocity by modifying the mechanical properties of one or more site layers below the surface.

In embodiments, the method includes design phase and a subsequent construction phase to implement design modifications to one or more layers. The design modifications depend on properties of layers between the site surface and the competent rock horizon (where the seismic motion is defined) and the surface. Embodiments may use well-established technologies to determine the shear wave velocity profile for site amplification calculation. In an embodiment, the design phase determines which layer or layers to modify to adjust the shear wave velocity profile as needed, and the construction phase implements the changes to the layer or layers as determined by the design phase. Embodiments may provide the most effective modification in terms of the depth of layer to be modified. Also, it is possible that more than one layer must be modified to provide an effective solution that sufficiently reduces the intensity of motion at or near the ground surface.

Theoretically, if it were possible to have a one-inch thick air gap in the site profile under a building site, say one mile below ground surface, one standing on the site would hardly feel the earth shaking no matter how large the seismic event is shaking the larger area. This is because the one-inch thick air gap would completely disrupt the seismic wave path between the rock layer at depth and the site. However, it is not feasible to insert an air gap because of the weight of the soil and rock above it. So, in embodiments, in the design phase the idea is to determine what layer to modify and how to modify the layer to interrupt the seismic wave path so that most of the energy is reflected back into the ground, rather than being amplified and allowed to reach to the site surface.

For the construction phase, there are construction probes already in use that may be used to modify shallow layers. These probes are currently used to break up the soil at a certain depth and mix it with cement to improve its stiffness and strength—mostly to avoid liquefaction. In the construction phase of embodiments, these same probes maybe used to break up the ground. However, depending on the modification determined by the design phase, the construction probes may or may not subsequently inject cement. It can be designed so that the breaking up of the soil, alone, creates the designed modification that will change the shear wave velocity of the soil at the designed modification depth.

However, most sites will be located where the layer or layers to be modified are deep enough that they require the use of vertical boring and horizontal drilling to break up the rock layers. Horizontal drilling and fracking (also called hydraulic fracturing) has significantly improved in the last 10 years and has put the USA as the number one producer of gas and oil in the world. The techniques associated with horizontal drilling and fracking are used to break up the rock (i.e., shale) where oil and gas are trapped. After fracking the rock, the gas and oil can escape and enter the horizontal boring and be extracted to the surface. Many oil and gas companies now are performing such operations. The fracking is performed using a mixture of water, sand, and other chemicals and injecting the mixture into the bore (horizontal or vertical) under very high pressure (10,000 psi or more).

In embodiments, techniques for horizontal drilling and fracking may be used to modify the properties of a specific layer (usually a rock layer). However, the current fracking techniques may be simplified—the simplification coming from the different goals of embodiments. In embodiments, the goal of using the fracking technique is to frack (break up) a layer of rock identified in the design phase, rather than to extract oil or gas. Thus, the fracking techniques may be simplified to limit its use to fracking only. The rock layer identified for fracking may be of any type of rock and does not need to be limited to shale where oil and gas are trapped.

As a confirmation of the design and construction phases, the site shear wave velocity at a construction site may be measured before, during, and after modifications have been made to the designated layer or layers to ensure the modification(s) accomplishes the designed reduction in seismic motion. In addition, once the modification is applied in the construction phase, seismic instruments (the equipment that record time history of ground shaking at the location of equipment—in effect measuring the intensity of ground motion) may be used to measure the intensity of motion at the modified site and compare it with the measured intensity of motion at a nearby unmodified site to confirm the performance of the modification.

Seismic Site Isolation (SSI)

Embodiments effectively reduce the seismic ground motion intensity at the level of the structure in the ground (at or near the ground surface, i.e., a designated ground layer) the frequency range most impacting the structure and its contents, and reduce the seismic stresses in the ground in order to reduce or eliminate the liquefaction failure or reduce the adverse seismic effects on underground facilities. It should be noted that for critical facilities, the cost of equipment housed inside the structure may be much more than the cost of the structure itself, especially since some of the critical equipment may be required to be designed to remain operational during and after an earthquake, e.g., for seismic safety and the safe shut down of the facility after a major event. For this reason, the seismic response motion of the structure at the location of the equipment in the structure needs to be predicted and used for qualification of the equipment before it is accepted for installation. For such critical structures, a benefit of embodiments is that the reducing the ground motion reduces the seismic load for structural design as well as reduces the seismic response of the structure for equipment design and qualification. For sites with the potential for liquefaction, reducing the intensity of ground motion also reduces seismic stresses in the ground, thereby reducing and/or eliminating the liquefaction risk.

An embodiment focuses on the path travelled by the seismic wave of the multistep site-amplification, discussed above. The embodiment focuses on changing the properties of one or more specific layers in a site profile, where "changing the properties of a layer" includes changing one or more mechanical properties of the layer (e.g., properties such as density and damping). In an embodiment, changing the mechanical property of a layer is directed to reducing the intensity of ground surface motion at a desired frequency range of interest and thereby reduce the intensity of the motion experienced by the structures. In an embodiment, changing the mechanical property of a layer is directed to reducing the motion intensity at desired frequency range of interest and thereby reduce the absolute motion experienced by the structures. A reduction in ground motion is accompanied by reduction in shear stresses in the soil layers which in turn reduces or eliminates the risk of liquefaction for sites with potential for liquefaction. Further reduction in shear stresses in soil can be designed by modifying additional layers in the site profile.

Seismic Site Isolation (SSI) Approach

In an embodiment, a Seismic Site Isolation (SSI) is the modification of site properties with the objective of reducing seismic motion at frequencies of interest and reducing the risk for liquefaction. An SSI uses a site amplification, which itself is based on the theory of wave propagation in geologic medium. According to an embodiment, a sharp contrast in dynamic properties of adjacent layers (known as the impedance ratio) is used to change the characteristics of wave propagation. Where the sharp change in the impedance ratio is between the layer at depth and the surface, the sharp change has the potential to reflect part of the incoming seismic wave(s) back into the ground (i.e., away from the surface) thereby reducing the ground motion at or near the ground surface.

FIG. 1 is a chart illustrating an example of shear wave velocities of a site showing an in situ site shear wave velocity profile and a modified site shear wave velocity profile with one layer modified to reduce the velocity profile. In FIG. 1, the shear wave velocity profile for the in situ condition is shown by curve 104. This site is from a site in the USA where the geotechnical data was obtained from an extensive geotechnical filed and laboratory program. A modified site shear wave velocity profile is shown by curve 102 where the mechanical properties of one layer, i.e., the shear wave velocity of the one layer, in the site profile has been modified. The modified site shear wave velocity profile shown by curve 104 shows a modified layer a layer at depth (here the layer at approximately 1700 ft) that was modified to decrease its shear wave velocity. The modification creates a sharp contrast in the shear wave velocity at 1700 ft with the layer below it: 2,000 ft/sec over approximately 8,500 ft/sec, or a ratio of over 4:1. In an embodiment, a satisfactory ratio of shear wave velocities may be as little as 2:1. In an embodiment, a satisfactory ratio of shear wave velocities may be less than 2:1, such as 1.5:1. Note that the only difference between the in situ curve 104 and the modified curve 102 occurs at approximately 1700 ft where the reference numbers 102 and 104 are located. The rest of the shear wave velocity profile remain the same.

For the example shown in FIG. 1, site amplification analysis was performed following the current industry approach to obtain the surface motion. In practice, seismic motion is expressed with an acceleration response spectrum that shows the intensity of the ground motion at different frequencies. For a structure with a given natural frequency, the acceleration experienced by the structure may be estimated from a plot of the acceleration response spectrum. In an embodiment, a site amplification analysis requires: the obtaining of the seismic motion of a rock horizon at depth; the measurement of (or the obtaining of if known) the shear wave velocity profile of the site; and the preparation of a model of the site using the shear wave velocity profile. The site amplification analyses may then be performed using the obtained seismic motion and the model to obtain the predicted ground layer motion (FIG. 2) and the predicted shear stress for each layer (FIG. 3) for the in situ site. Modifications may be made to the shear wave velocities of a layer of the model and the site amplification then performed using the obtained seismic motion and the modified model to obtain the predicted modified ground layer motion (FIG. 2) and the predicted modified shear stress for each layer (FIG. 3).

Figure 2:
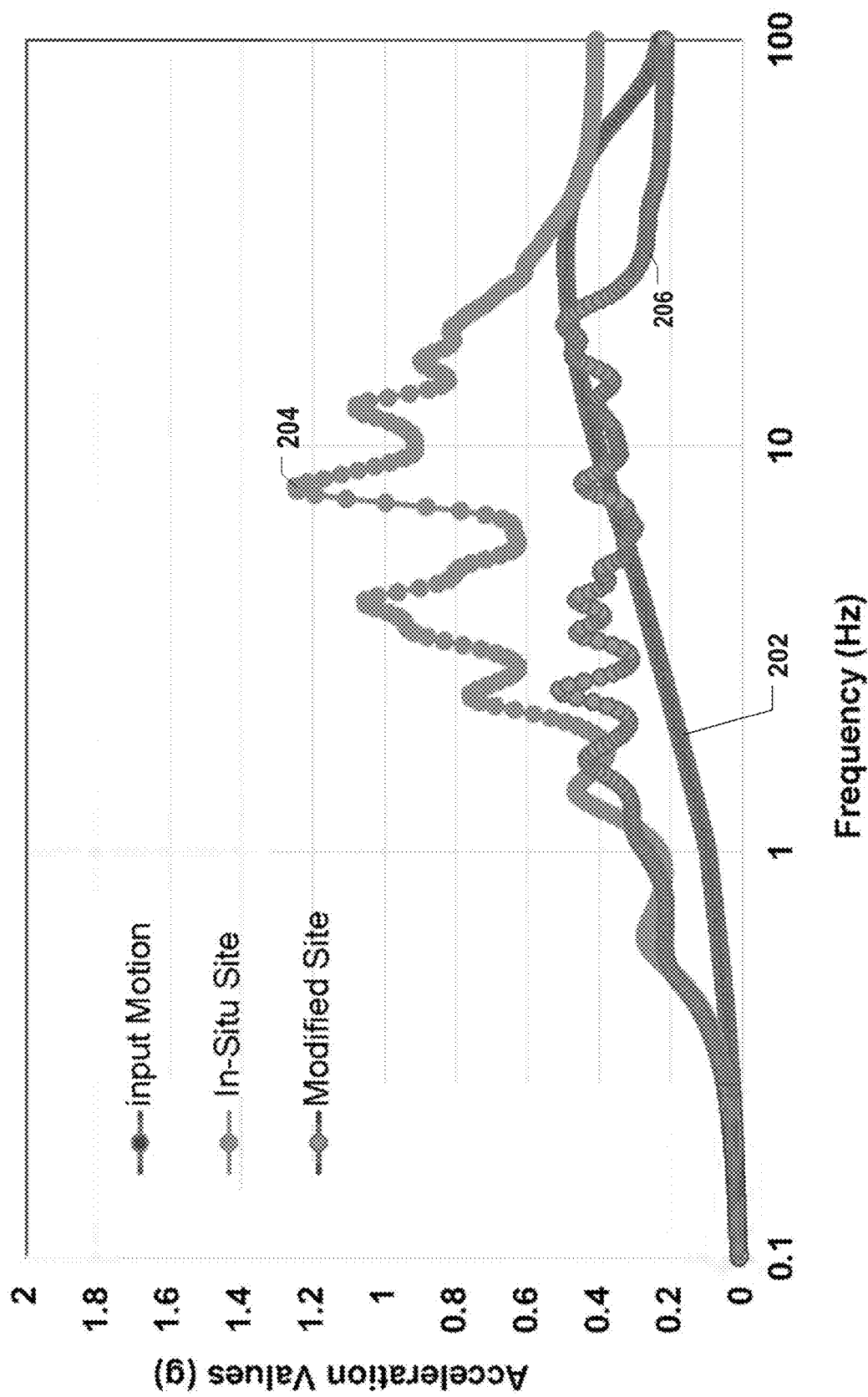
FIG. 2. is a chart illustrating computer-modeled surface ground motions of an in situ site and a modified site along with the input motion.

FIG. 2. is a chart illustrating surface ground motions of the in situ site profile (curve 204) and a modified site profile (curve 206) along with the input motion (curve 202) used in the site amplification analysis across a wide frequency range. From a site amplification analysis using a model based on the measured shear wave velocity profile, one can obtain the maximum value of stress for each layer. From a site amplification analysis using a model based on the measured shear wave velocity profile and modifications to the shear wave velocities of one or more layers, one can obtain the predicted maximum value of stress for each layer if the modifications were actually made to the layer or layers. In FIG. 2, the acceleration response spectrum for the in situ site 206 was obtained from the SSHAC process for a rock horizon at the site at the depth of about 1,700 ft, using input motion 202 as the basis for the site amplification. The input motion 202 corresponds to a 10,000-year earthquake, as required if a critical facility were being constructed at the site. As shown in FIG. 2, modified site curve 206 shows a drastically reduced acceleration response spectrum in comparison to the response of in situ curve 204. The reduction in the intensity of motion is significant at a wide range of frequencies—reaching a maximum reduction of more than a factor of 2.

Figure 3:
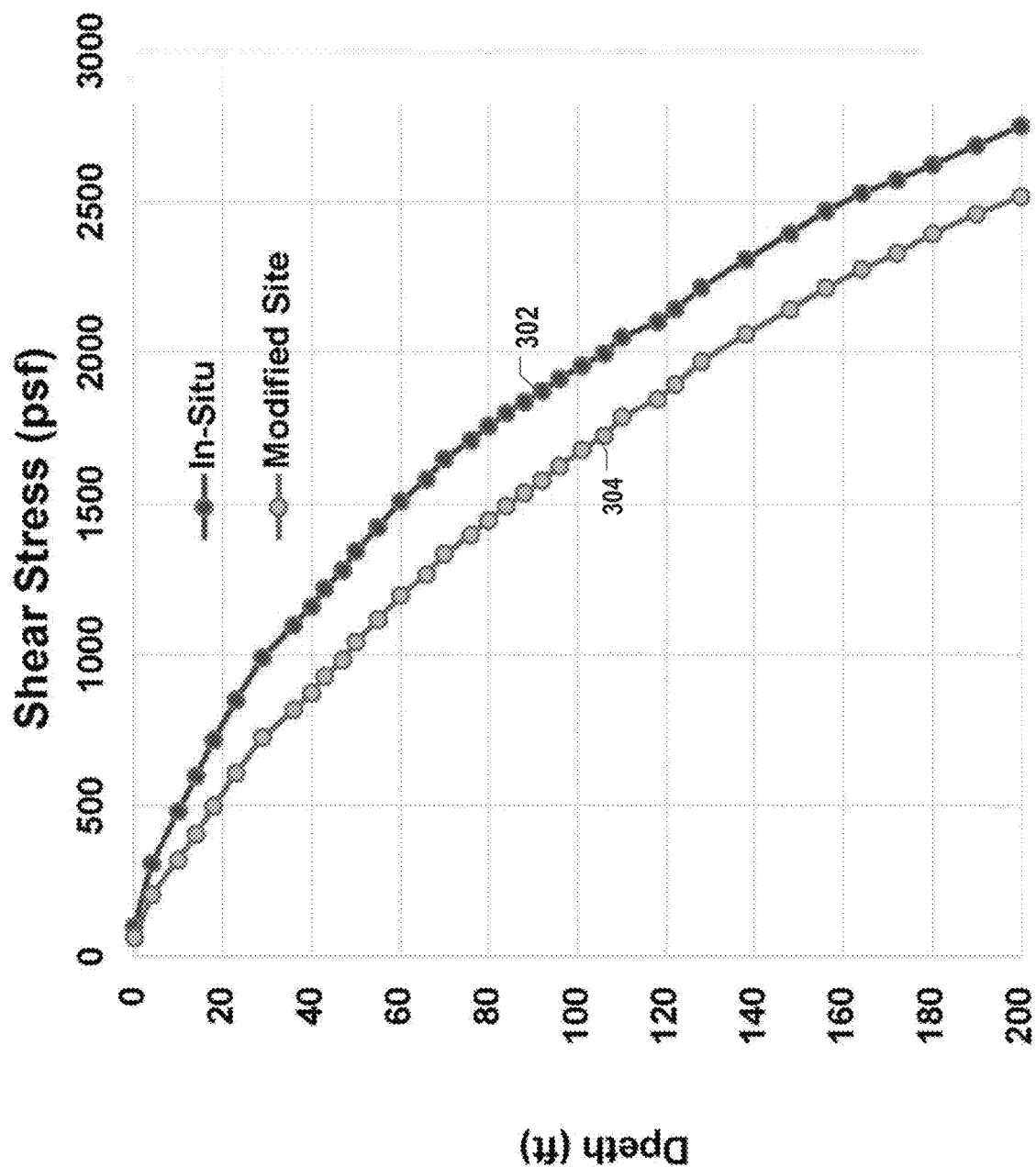
FIG. 3 is a chart illustrating the computer-modeled maximum shear stress of an in situ site and a modified site.

Using the velocity profiles in FIG. 1 and the same rock input motion shown in FIG. 2, FIG. 3 is a chart illustrating the maximum shear stress profile of an in situ site 302 and a modified site 304 at depth. In FIG. 3, the maximum seismic soil shear stresses are compared for in situ 302 and modified 304 site conditions. From site amplification analysis one can obtain the maximum value of stress for each layer. Typically, the maximum seismic soil shear stress is the response quantity used for a liquefaction evaluation of a site. There are other simplified methods for liquefaction analysis that estimate the maximum shear stress from the maximum peak ground acceleration at the ground surface, effectively obtaining the maximum shear stress in the soil layers in simplified approximate approach. As shown in FIG. 3, the reduction in soil stresses are also significant at shallow to deeper depths in the profile. The reduction in seismic stress that results from an embodiment can change a site from having a high risk of liquefaction to a site with a very low risk of liquefaction. The example shown in FIG. 3 is presented for illustration of a benefit of the embodiments and does not necessarily reflect the most optimum isolation design for a particular site.

Seismic Site Isolation (SSI) Design Approach

A. Design Phase

In an embodiment, the first step is to obtain the seismic motion at the design level for a layer at depth, as discussed above. This initial layer may be called Layer 1 for convenient reference. The next step is to obtain the site amplification results for the site as is (in situ) to obtain reference results that show the intensity of motion at the ground surface if no modifications are made. The results for the site amplification of the in situ site from Layer 1 may be called Case 1. Next, in the in situ Case 1 model of the site amplification, one or more mechanical characteristics of one layer above Layer 1 are modified and the site amplification is performed using the modifications to provide new results, which with the corresponding modifications may be called Case 2. Then, the in situ Case 1 profile is revisited and a new layer (i.e., at a different depth) is chosen, one or more of the characteristics of the new layer is modified, and a new site amplification performed to obtain results, which with the corresponding modifications may be called Case 3. In each of these cases, only one layer is modified. In each of these cases, each layer is at a different depth. In an embodiment, cases may be developed for each discernable layer between Layer 1 and the ground surface. In an embodiment, cases may be developed for a subset of the discernable layers between Layer 1 and the ground surface, with the subset of layers chosen based on, e.g., a review of the layer properties and experience regarding the effect of modifying such layers in relation to nearby layers. Once a series of cases are developed for the desired layers (i.e., each layer between Layer 1 and the ground surface, or a subset of these layers), the site amplification results of all cases are compared. The most optimum case is selected whose results show the least amplification at the frequency range of interest. This case is designated the Design Profile.

It should be noted that where a site amplification is performed from Layer 1 to at or near the ground surface, the "at or near the ground surface" represents a ground layer at the depth of interest, which may vary according to the proposed structure to the extent that the ground "surface" of interest may actually be at a depth below the actual surface at the depth corresponding to the foundation of the structure (s).

In the Design Profile, the amplification at the frequency range of interest may or may not be satisfactory. If the Design Profile, which at this point is based on a site amplification with only a single modified layer, needs to be improved to further reduce the amplification, the Design Profile may be designated as the reference case (Case 1) and an additional layer may be modified and its site amplification results are compared with those of the new reference Case 1, as described in the previous paragraph, the difference being that now in each site amplification there are two modified layers in the profile. Again, once a series of cases are developed for the desired layers (i.e., each layer between Layer 1 and the ground surface, or a subset of these layers), the site amplification results of all cases are compared. From the comparison, one case is selected whose results show the least amplification at the frequency range of interest. This case will have two modified layers between Layer 1 and the ground surface.

For a site under in situ condition (i.e., without modification), the results of the site amplification are driven by the site profile and the properties of the various layers. When one layer in the profile is modified, i.e., when the characteristics representing that layer in the profile model are modified, the results of the site amplification will change.

Two parameters cause the major changes in the site amplification results. The first is how greatly the shear wave velocity of a layer is changed based on the modification to the layer. The second is the depth of the layer being modified. Regarding the first (the extend of change), while the model for a layer may be changed arbitrarily, in practice, the changes to the in situ site profile model should attempt to mimic the ability to change any particular physical layer. For example, changes to the model should attempt to mimic the changes to a layer that may be realized using the methods discusses with regard to FIG. 10 (ground modification at shallow depths) or FIG. 11 (ground modification at more significant depths (e.g., "'racking"). As such, changes to the model should mimic the real-world ability to modify any particular layer given the in situ properties of the layer. For layers that are so deep that fracking is the only practical method of modification to reduce the shear wave velocity, the use of higher pressure for fracking will increase the extent of cracking in the rock layer and reduce the layer's shear wave velocity, but there is a limit as to how low the shear wave velocity will be reduced. In embodiments, modeling may be used to identify a minimum change needed in the velocity of the layer, and the model for the layer then changed to obtain at least the minimum change in velocity (beyond the minimum amount, the benefits only increase). In embodiments, the minimum thickness of the modified layer may also be determined in the design phase (and, again, beyond the minimum the benefits only increase).

Regarding the second parameter (depth), modifications impact the frequency range of the site amplification with the reducing in frequency range varying with the depth of the modified layer. That is, if the modified layer is at shallower depth it will tend reduce the results of the site amplification at a higher frequency range. If the modified layer is at a deeper depth it will tend to reduce the results of the site amplification at a lower frequency range. If the modification is performed at two layers, the reduction in amplification may cover a wide range of frequencies. For example, target structural design frequencies typically range from 1 to 5 Hz, and target frequencies for equipment (e.g., safety equipment) typically range from 5 to 15 Hz.

In general, reductions in the low frequency range are of greater interest, but there are facilities with sensitive equipment that benefit from reductions in the high frequency range as well. Thus, the scenario exists in which it would be desirable to reduce both low and high frequency ranges, which may require modifying one, two, or more layers. And to reduce the amplification for a wide frequency range, in an embodiment a first series of layer modifications and site amplifications is addressed at reducing low frequencies and a second series of layer modifications and site amplifications is addressed at reducing high frequencies. As a result, in an embodiment, the iterative process is applied to determine a modification (or modifications) to a layer (or layers) where the compared results focus on a first frequency range and a case (e.g., Case F1 for "frequency range 1") is chosen that satisfactorily addresses the first frequency range. Subsequently, with Case F1 as the reference case, an additional modification (or modifications) is made to a layer (or layers) where the compared results focus on a second frequency range and a case (e.g., Case F1/2 for "frequency range 1 and 2") is chosen that satisfactorily addresses both the first and second frequency ranges. Off course, performing modification on multiple layers at multiple depths would add to the cost. For example, it may require two horizontal drilling plans from the same vertical boring.

In an embodiment, a method of implementing SSI for a site may include the following steps.

1. Obtain the seismic motion at a required design level (475-year EQ or higher level depending on the performance goal for the structure(s) of interest) for a rock layer present at the site at depth. The seismic motion at the rock level may be available from national seismic maps or from recent seismological studies such as SSHAC described above. If the seismic rock motion is not available, it may be developed from well-established methods currently practiced by seismologists.

2. Obtain the in situ site properties, layer by layer, for use in the modeling and site amplification analysis. The properties can be obtained from a field and laboratory geotechnical program developed for the site. Such program development is a common practice for many structures and, in particular, for critical facilities that require a comprehensive geotechnical program to obtain the geotechnical properties for the site. In an embodiment, the property of interest for SSI design is the shear wave velocity of the soil or rock layer by layer. The shear wave velocity represents the speed that the seismic shear wave (the most destructive seismic wave) would travel in the layer. This property ranges from few hundred feet per second for soft soils to over 10,000 ft/sec for competent rock. Geophysical techniques in common use today, such as downhole, uphole, suspension logging, and spectral analysis of surface waves (SASW), may be used to obtain the shear wave velocity of the soil and rock layers, including the shear wave velocity of each layer at a particular site.

3. Once the site velocity data and other necessary geotechnical data are acquired, a computer model of the site profile is constructed and an in situ site amplification analysis is performed. The site amplification may use programs such as SHAKE for one dimensional analysis, or SASSI for two- or three-dimensional analysis. Two- or three-dimensional analysis is required to identify the lateral dimensions of the layer modification so that the reduction in the motion intensity at the foot print area of one or multiple structures of interest are realized. The site amplification uses the rock motion at depth as input and provides the response at the ground surface level. Comparison of the response at the ground surface to the input rock motion at depth provide the amplification of the motion due to site amplification of the in situ site. The amplification magnitude is mainly a function of the site shear wave velocity profile. Typically, at the lower frequencies that are relevant for most structures, the motion tends to amplify as the wave propagates upward, although at some higher frequencies, which are typically not significant to structures, the motion is reduced in intensity due to damping as it propagates to the ground surface.

4. Following step 3, an iterative calculation is performed. In each iteration, one layer of the in situ site profile in the computer model is modified by changing that layer's shear wave velocity (and other associated properties, such as density and damping, to be consist with the modified shear wave velocity) and the site amplification analysis is repeated, which results in obtaining a new ground motion at or near the ground surface. In an embodiment, an effective method for identifying a target layer for modification is to find a layer that, upon modification, will have a shear wave velocity that is a sharp contrast with the shear wave velocity of the layer immediately below it. In an embodiment, "a sharp contrast" in shear wave velocities is found where the upper layer has a shear wave velocity that is one-half or less than that of the lower layer. The sharp contrast in velocity, and the associated change in impedance, reflects part of the seismic waves back into the ground. In the next iteration the depth of the modified layer in the profile is changed and the analysis is repeated. After similar site amplifications with modifications to all layers of interest have been performed, the results are compared to determine the most effective modification. In an embodiment, this process may determine the optimum depth and the optimum range for the modified layer shear wave velocity, such that the least amount of site amplification is required.

5. In an embodiment, for some sites and depending on the extent of the desired reduction in site amplification, two or more layers at different depths may need to be modified to obtain the most reduction in responses. Two or more layers may also need to be modified where reductions in site amplification at different frequency ranges are targeted.

6. In an embodiment, depending on the footprint of the facility at the ground surface, two-dimensional and, potentially, three-dimensional models of the site may be developed to perform site amplification analysis using programs such as SASSI. In such site amplifications, the effect of modifications to a layer on the lateral extent of the site amplification can be evaluated and optimized—so that the process accounts for the entire footprint of the facility.

7. In an embodiment, depending on the in situ site stratigraphy, which may include layers that are not horizontal, e.g., layers that dip at an angle, or other shapes such as concave or convex, the model of the site profile may be modified to account for the non-horizontal site layers.

8. In an embodiment, if liquefaction failure is a concern, the site amplification iterative analysis may also be used to provide the maximum shear stresses in the soil layers with liquefaction potential in each iteration. The optimum modified soil profile may be the one that provides the most reduction in the maximum stresses to reduce or eliminate the liquefaction risk. The criteria for liquefaction is well defined. Generally, only certain types of soil liquefy, e.g., sands, gravels and some other soil types well defined in practice. Intact rock and most clayey soils are not susceptible to liquefaction. When a site includes a soil type that can liquefy, and there is also ground water present, then shear stress in the soil is the main seismic parameter used to assess the risk of liquefaction under the design EQ. As may be expected, the higher the shear stress the larger the effect of liquefaction. As a result, using embodiments of the method to reduce amplification may result in significant reductions in damage due to liquefaction.

Figure 4:
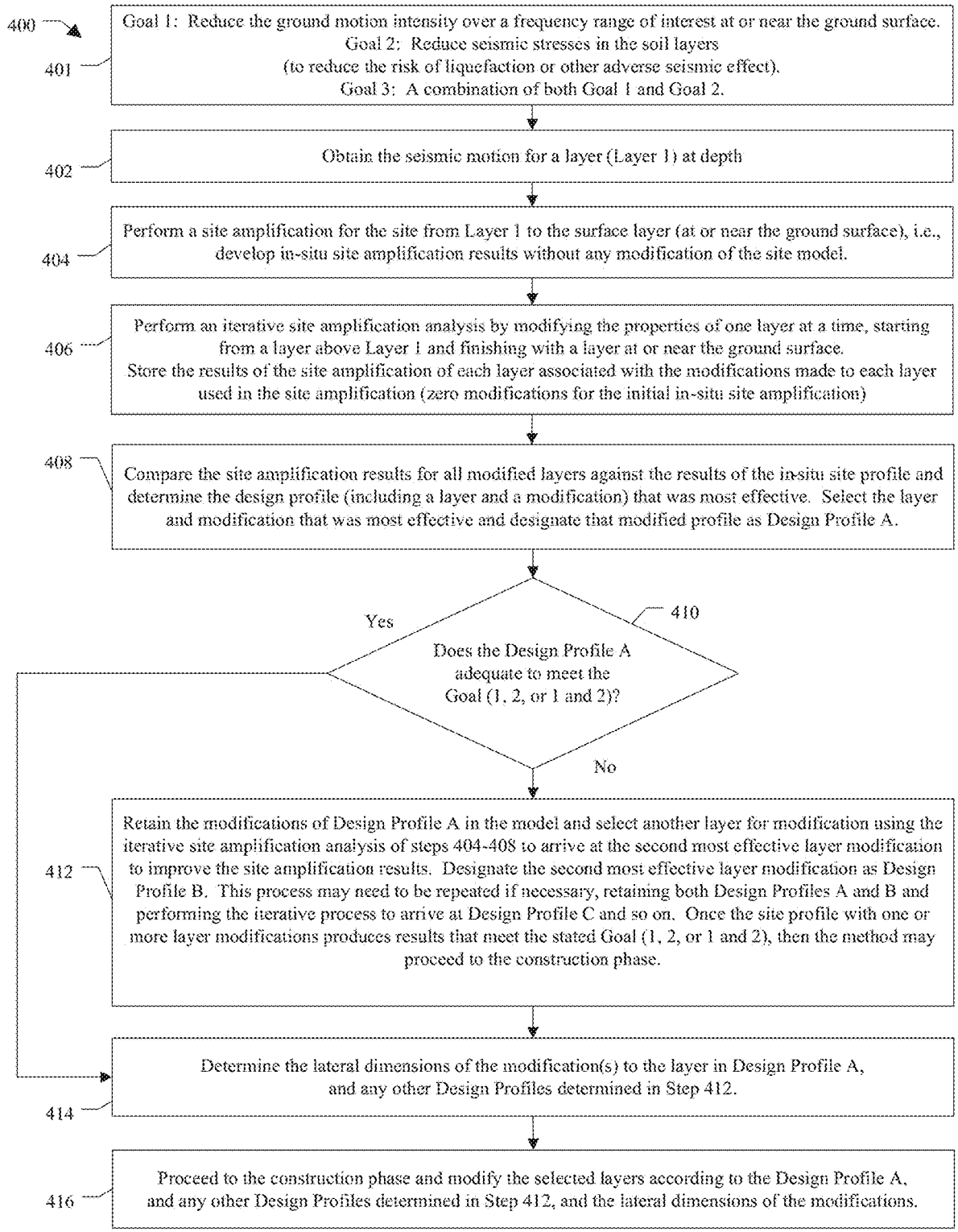
FIG. 4 is a flow diagram of an embodiment for reducing the effect of a seismic event.

FIG. 4 is a flow diagram of an embodiment of a method 400 for reducing the adverse effects of a seismic event. In method 400, as shown in step 401 the goals of the method may be one of: Goal 1—reduce the ground motion intensity at a frequency of interest at or near the ground surface; Goal 2—reduce seismic stresses in the soil layers with potential for liquefaction (to reduce the risk of liquefaction or other adverse effects for buried structures and utility lines); or Goal 3—a combination of both Goal 1 and Goal 2. In step 402, the seismic motion is obtained for a layer (Layer 1) at depth. In step 404, a site amplification is performed for the site from Layer 1 to the surface layer (at or near the ground surface) to obtain the design profile of the seismic motion for the in situ conditions. In other words, an in situ site amplification is developed for the site without any modification of the site model. In step 406, an iterative site amplification analysis is performed by modifying the properties of one layer at a time, starting from a layer above Layer 1 and finishing with a layer at or near the ground surface. In step 408, the results of the site amplification of each layer are stored associated with the modifications made to each layer used in the site amplification (zero modifications for the initial in situ site amplification). In step 410, the site amplification results for all modified layers are compared against the results of the in situ site profile and the design profile (including a layer and a modification) that was most effective is determined. The layer and modification that was most effective is selected and that modified profile is designated as Design Profile A. In step 410, if the Design Profile A is adequate to meet the Goal (1, 2, or 3), then in step 414, the lateral dimensions of the modification to the layer(s) must be determined. For this evaluation, a three-dimensional site amplification of the design profile is performed using changes to the lateral dimensions of the models of the modified layer(s). In embodiments, the lateral dimensions of a layer may be changed from the footprint size of the structure(s) to a larger area that extends beyond the footprint size. The lateral dimensions are thus changed to establish the lateral extent of layer(s) modifications that ensure the desired reduction in site amplification over the area of the interest (and at or near the ground surface). With the lateral dimensions determined, in step 414, the construction phase is entered, in step 416, and the selected layer is modified according to the Design Profile A and the determined lateral dimensions. However, if in step 410, if the Design Profile A was not adequate, then in step 412, the modifications of Design Profile A are retained in the model and another layer is selected for modification using the iterative site amplification analysis of steps 404-408 to arrive at the second most effective layer modification to improve the site amplification results. The second most effective layer modification is designated as Design Profile B. This process may need to be repeated if necessary, retaining both Design Profiles A and B and performing the iterative process to arrive at Design Profile C and so on. Once the site profile with one or more layer modifications produces results that meet the stated Goal (1, 2, or 3), then the method may proceed to the determination of lateral dimensions 414 and construction phase 416 in which the selected layers are modified according to the Design Profile A and any other Design Profiles determined in Step 412.

Figure 5:
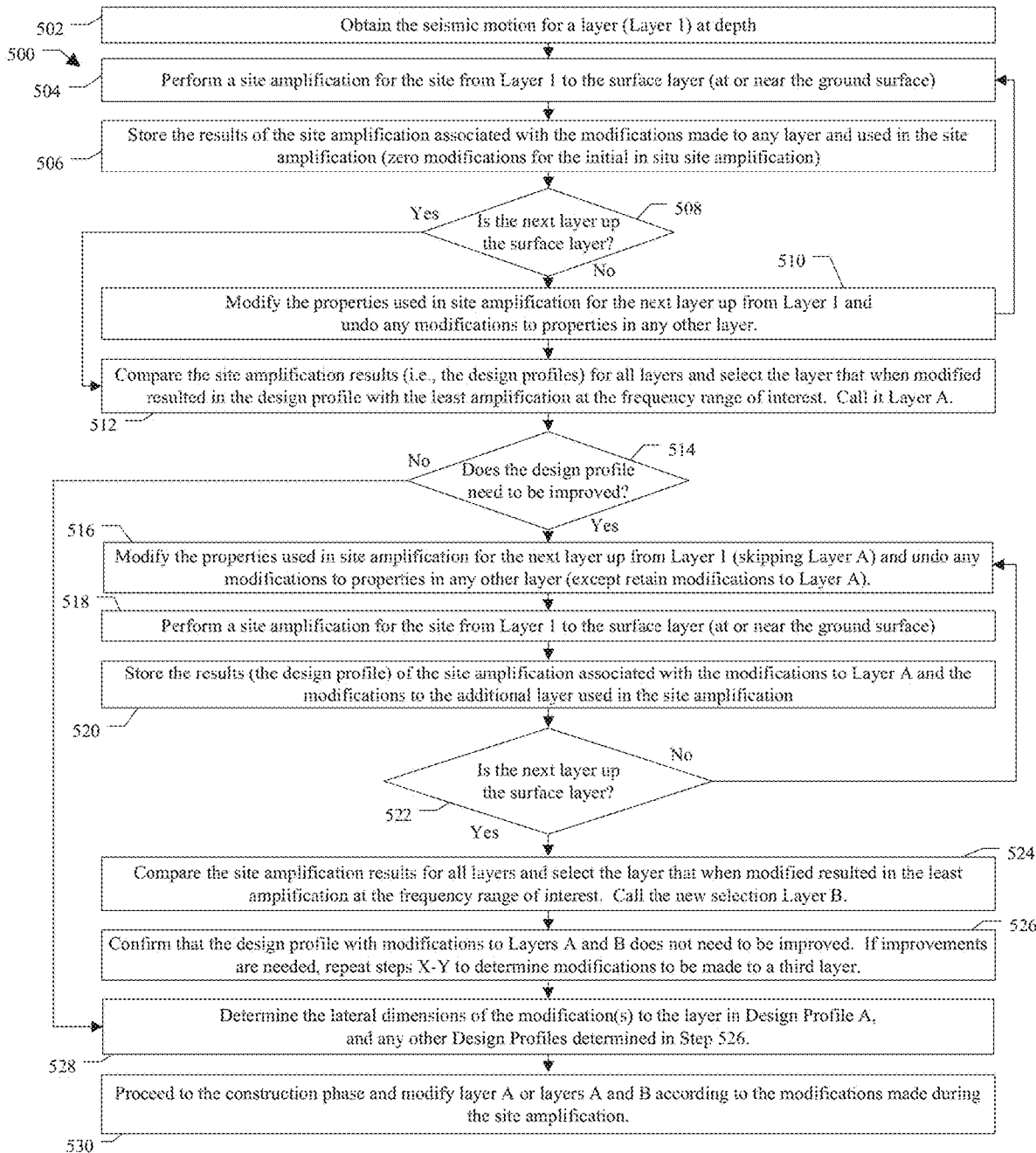
FIG. 5 is a flow diagram of an embodiment for reducing the effect of a seismic event.

FIG. 5 is a flow diagram of an embodiment of a method 500 for reducing the effect of a seismic event. In step 502, the seismic motion for a layer (Layer 1) at depth is obtained. In step 504, a site amplification for the site from Layer 1 to the surface layer (at or near the ground surface) is performed to obtain the design profile of seismic motion for the in situ conditions. In step 506, the results of the site amplification is stored, associated with the modifications made to any layer and used in the site amplification (zero modifications for the initial in situ site amplification). In step 508, if the next layer up is not the surface layer (or so shallow that modification would not result in adequate improvement), then in step 510, the properties used in site amplification for the next layer up from Layer 1 are modified and any modifications to properties in any other layer are undone, and steps 504-506 are repeated for that next layer. In step 508, if the next layer up is at shallow depth, then in step 512, the site amplification results for all layers are compared and the layer that when modified resulted in the least amplification at the frequency range of interest is selected and called Layer A. In step 514, if the design profile associated with Layer A does not need to be improved (e.g., meets the desired goal), then in step 528, the lateral dimensions of the modification to the layer(s) must be determined. For this evaluation, a three-dimensional site amplification is performed to obtain the design profile using changes to the lateral dimensions of the models of the modified layer(s). In embodiments, the lateral dimensions of a layer may be changed from the footprint size of the structure(s) to a larger area that extends beyond the footprint size. The lateral dimensions are thus changed to establish the lateral extent of layer(s) modifications that ensure the desired reduction in site amplification over the area of the interest (and at or near the ground surface). With the lateral dimensions determined, in step 530, the construction phase is entered and Layer A is modified according to the modifications made during the site amplification. If in step 514, the design profile associated with Layer A needs to be improved (e.g., it does not meet the desired goal), then the process is repeated to determine an additional second layer that when modified (and retaining the modifications to Layer A) meets the desired goal. Thus, in step 516, the properties used in the site amplification for the next layer up from Layer 1 (skipping Layer A) are modified and any modifications to properties in any other layer are undone (except modifications to Layer A are retained). In step 518, a site amplification is performed for the site from Layer 1 to the surface layer (at or near the ground surface). In step 520, the results of the site amplification are stored, associated with the modifications to Layer A and the modifications to the additional layer used in the site amplification. In step 522, if the next layer up is not the surface layer, then steps 516-520 are repeated. In step 522, if the next layer up is the surface layer, then in step 524, the site amplification results for all layers are compared and the layer that when modified resulted in the least amplification at the frequency range of interest is selected. Call the new selection Layer B. In step 526, it is confirmed that the design profile with modifications to Layers A and B does not need to be improved. If improvements are needed, repeat steps 516-524 to determine modifications to be made to a third layer. In step 526, upon confirmation that the design profile does not need to be improved, then step 528 is entered and the lateral dimensions determined (as described). Subsequently, in step 530, the construction phase is entered and Layers A and B (or additional layers) are modified according to the modifications made during the site amplification.

In an embodiment, the "next layer up" in step 508 of FIG. 5 may be so very deep that it cannot be modified practically. Thus, in step 508, "next layer up" may be understood to refer to the next layer up that may be modified practically. For example, the actual "next layer up" may be as deep as 30,000 ft or more. While a layer at that depth could be modeled, the result would not provide a practical solution. Thus, for a practical solution, the "next layer up" should refer to a layer that may be modified in a practical manner.

Figure 6:
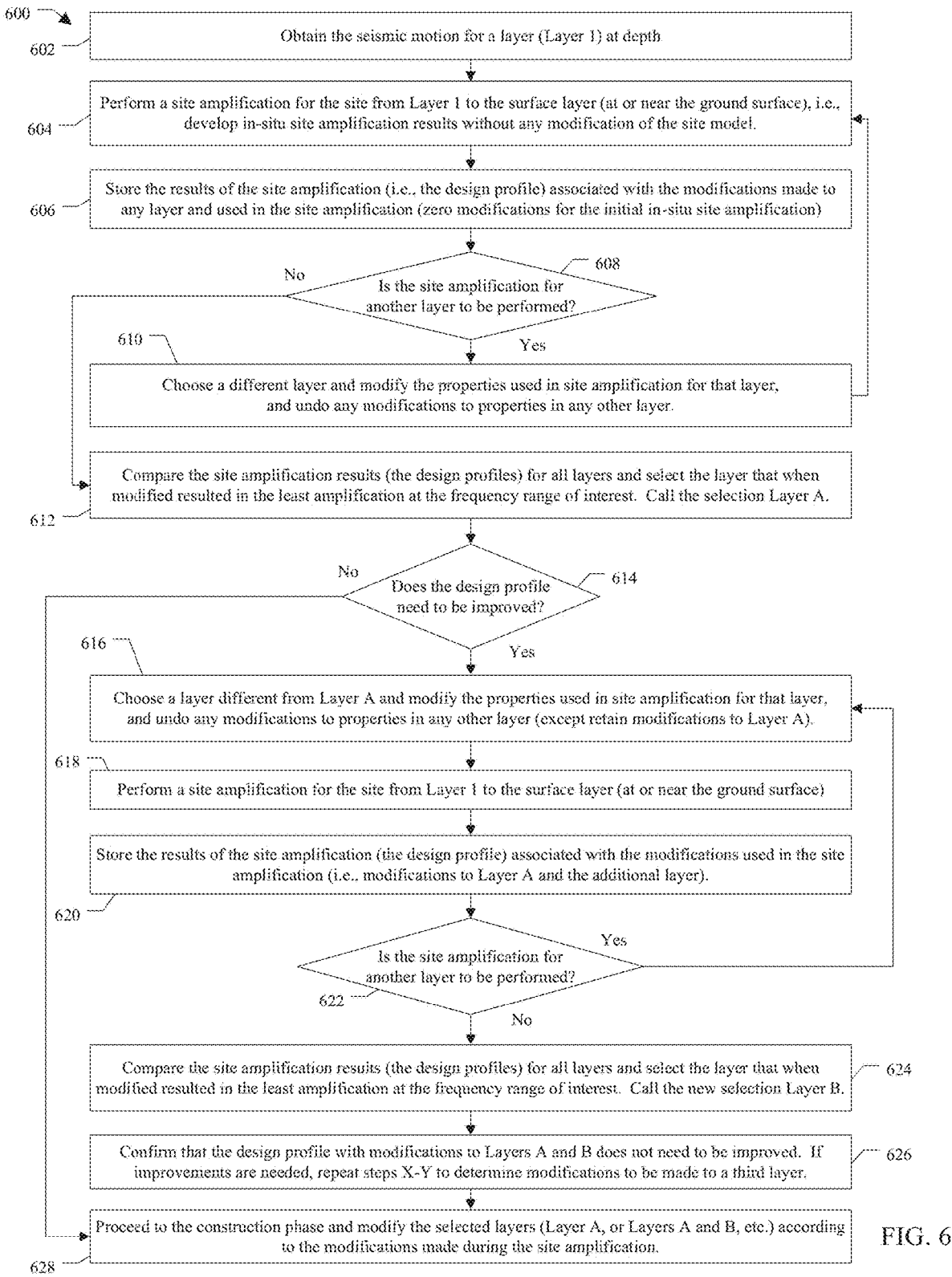
FIG. 6 is a flow diagram of an embodiment for reducing the effect of a seismic event.

FIG. 6 is a flow diagram of an embodiment of a method 600 for reducing the effect of a seismic event. In step 602, the seismic motion for a layer (Layer 1) at depth is obtained. In step 604, a site amplification for the site from Layer 1 to the surface layer (at or near the ground surface) is performed, i.e., an in situ site amplification is developed without any modification of the site model to obtain the design profile for the seismic motion. In step 606, the results (i.e., the design profile for a layer) of the site amplification are stored associated with the modifications made to any layer and used in the site amplification (zero modifications for the initial in situ site amplification). In step 608, if another site amplification is to be performed (i.e., modifications to a different layer are to be investigated), then, in step 610, a different layer is chosen and the properties used in site amplification for that layer are modified, and any modifications to properties in any other layer are undone, and the steps 604-606 are repeated. In step 608, if another site amplification for another layer is not to be performed, then in step 612, the site amplification results (the design profiles) for all layers are compared and the layer that when modified resulted in the least amplification at the frequency range of interest selected and called Layer A. In step 614, if the design profile associated with Layer A does not need to be improved, then in step 628, the construction phase is entered and Layer A is modified according to the modifications made during the site amplification. In step 614, if the design profile associated with Layer A does needs to be improved, then in step 616 a layer different from Layer A is chosen and the properties used in site amplification for that layer are modified, and any modifications to properties in any other layer are undone (except modifications to Layer A are retained). In step 618, a site amplification is performed for the site from Layer 1 to the surface layer (at or near the ground surface) with the modifications to the new layer (and Layer A). In step 620, the results (design profile) of the site amplification are stored associated with the modifications used in the site amplification (i.e., modifications to Layer A and the additional layer). In step 622, if a site amplification for another layer is to be performed, then steps 616-620 are repeated for a different layer. If not, then in step 624, the site amplification results (design profiles) for all layers are compared and the new layer selected that when modified resulted in the least amplification at the frequency range of interest and called Layer B. In step 626, it is confirmed that the design profile with modifications to Layers A and B does not need to be improved. If improvements are needed, repeat steps 616-624 to determine modifications to be made to a third layer. In step 628, upon confirmation that the design profile does not need to be improved, then the construction phase is entered and Layers A and B (or additional layers) are modified according to the modifications made during the site amplification.

Figure 7:
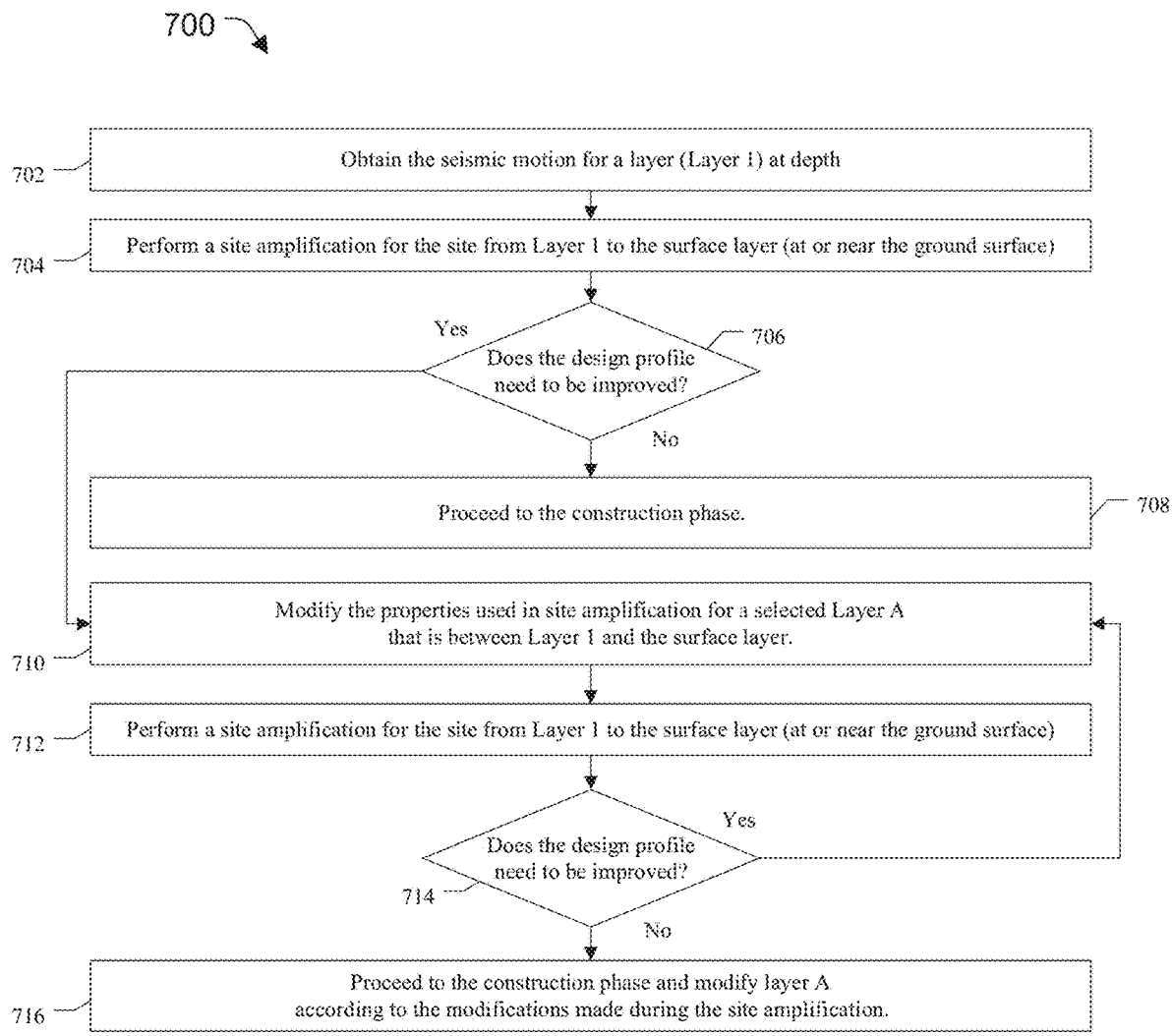
FIG. 7 is a flow diagram of an embodiment for reducing the effect of a seismic event.

FIG. 7 is a flow diagram of an embodiment of a method 700 for reducing the effect of a seismic event. In step 702, the seismic motion for a layer (Layer 1) at depth is obtained. In step 704, a site amplification for the site from Layer 1 to the surface layer (at or near the ground surface) is performed to obtain the seismic motion at the design level. In step 706, if the design profile obtained in step 704 (the in situ site amplification results) needs to be improved, then in step 710, the properties used in a site amplification for a selected Layer A that is between Layer 1 and the surface layer are modified. In step 712, a site amplification for the site from Layer 1 to the surface layer (at or near the ground surface) is performed. In step 714, if the design profile need to be improved, then in step 710 different modifications are made to the properties used in the site amplification for Layer A and in step 712, another site amplification performed. If, in step 714, the design profile does not need to be improved then in step 716 the construction phase is entered and Layer A modified according to the modifications made during the site amplification.

Figure 8:
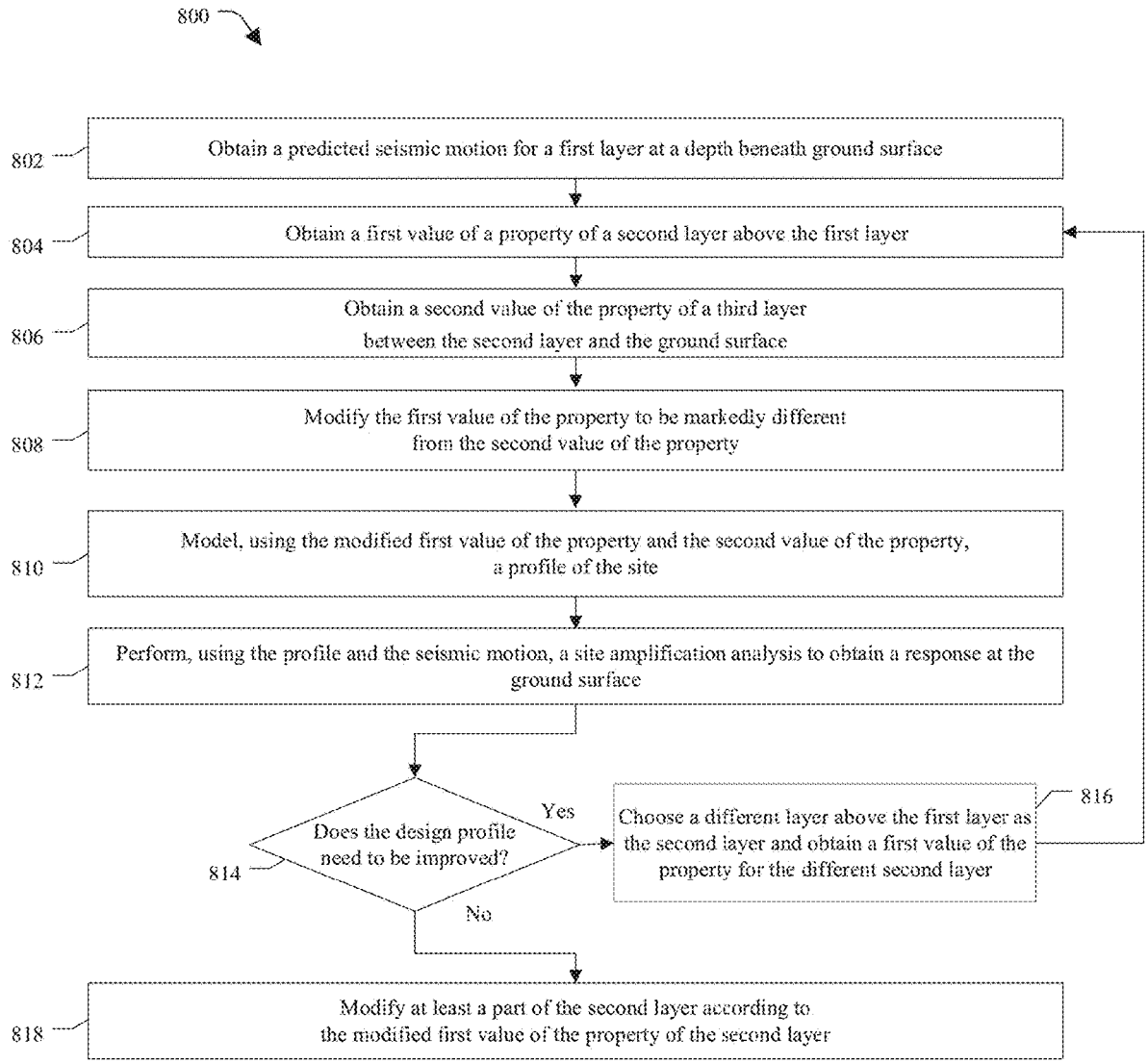
FIG. 8 is a flow diagram of an embodiment for reducing the effect of a seismic event.

FIG. 8 is a flow diagram of an embodiment of a method 800 for reducing the effect of a seismic event. In step 802, a predicted seismic motion for a first layer at a depth beneath ground surface is obtained. In step 804, a first value of a property of a second layer above the first layer is obtained. For example, the property may be the shear wave velocity in the layer. In step 806, a second value of the same property in a third layer between the second layer and the ground surface is obtained. In step 808, the first value of the property is modified to be markedly different from the second value of the property. For example, the shear wave velocity in the second layer may be modified to be markedly different from the shear wave velocity in the third layer. In step 810, using the modified first value of the property and the second value of the property, a profile of the site is modeled. In step 812, using the profile and the seismic motion, a site amplification analysis is performed to obtain a response at the ground surface. In step 814, if the design profile needs to be improved, then in step 816, a different layer above the first layer is chosen as the second layer and a first value of the property for the different second layer is obtained, and steps 804-814 repeated for the different second layer and different first value. If, in step 814, the design profile does not need to be improved, then in step 818, the construction phase is entered and at least a part of the second layer is modified according to the modified first value of the property of the second layer.

In embodiments, different modifications may be modeled and made to the same layer. For example, a thick layer may be modified in the same manner at more than one depth within the layer. Similarly, a thick layer may only require modification for a relatively thin slice of the thick layer. In addition, the type of modification at a given depth within a layer may be different. In other words, site amplifications may be performed using different modifications, each separately applied to the same layer. In an embodiment, the targeted change is a change in shear wave velocity. Also, in an embodiment, once a design profile is determined using the modification of a first property in the model, the design profile may be further optimized by evaluating the effect of changing a second property (in addition to or instead of the first property).

B. Construction Phase

Modification of specific soil or rock layer may be performed using methods of ground modification that are currently used in practice, or modified versions, depending on the depth of the layer identified for modification during the SSI design phase and the desired modification. In existing methods of ground modification, at depths of up to a few hundred feet, a probe with a rotating blade or water jet may be used to break up the layer. Subsequently, the broken-up layer may be mixed with cement injected from the probe to increase the stiffness and strength of the soil.

Figure 9:
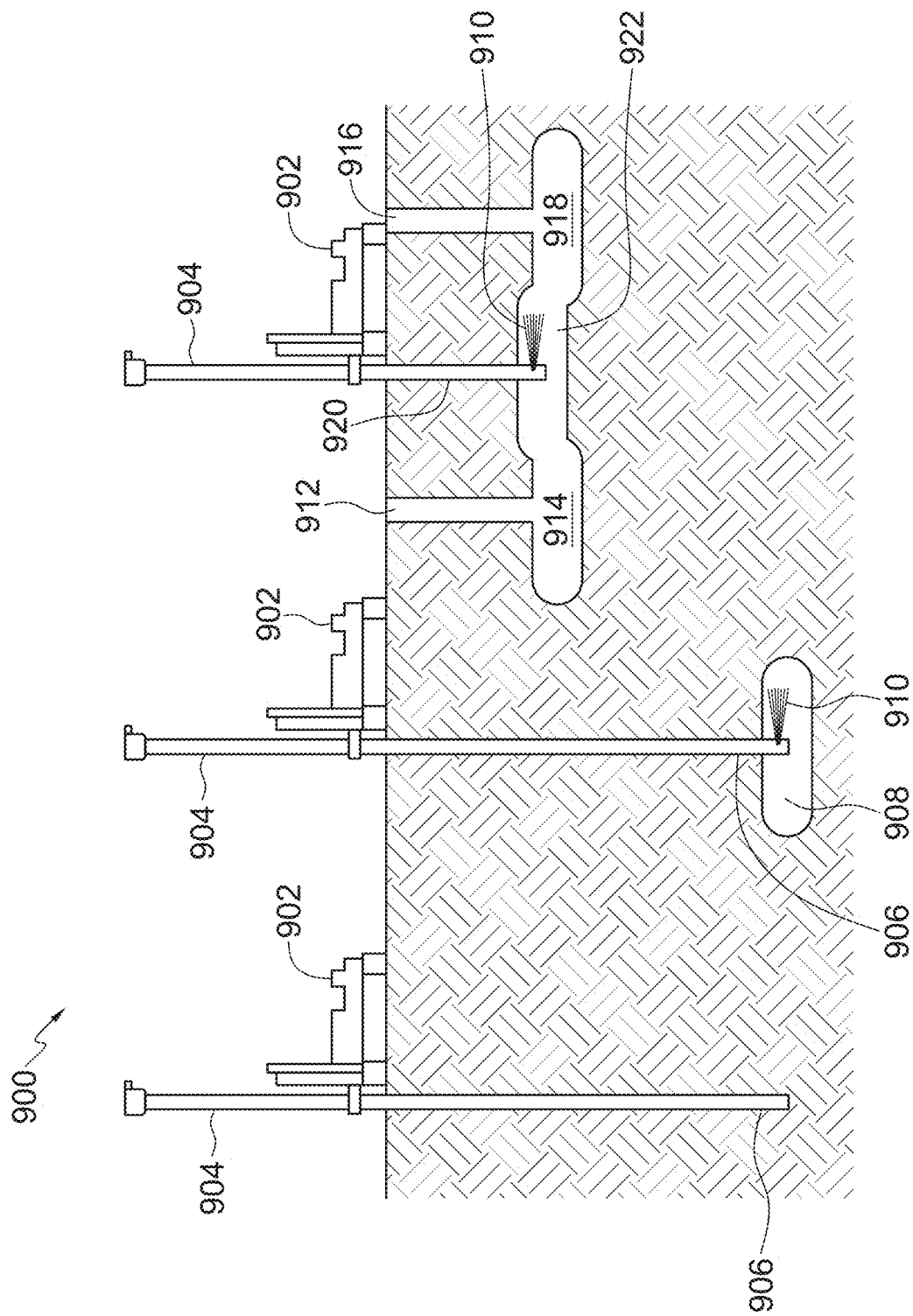
FIG. 9 illustrates a method of ground modification for relatively shallow layers.

In FIG. 9, for SSI application in the construction phase, the same technology may be used to implement the construction phase of embodiments. FIG. 9 illustrates an embodiment of a method of ground modification for relatively shallow layers. In FIG. 9, a probe 904 with a rotating blade or water jet 910 may be used to create a bore, e.g., bores 906, 912, 916, or 920, down to a desired depth in a layer. Subsequently, a rotating blade or water jet 910 may be used to break up a section, e.g., sections 908, 914, 918, 922, of the layer, where the layer, and the thickness within the layer to be modified, has been chosen during the SSI design phase. As shown in FIG. 9, the depth of the modified section may vary, e.g., compare the depth of section 908 to the depths of sections 914, 918, and 922. Also, as shown in FIG. 9, the area modified (as seen from above) may vary as well. For example, the section 908 is approximately one-third of the area modified by the combination of sections 914, 918, and 922. As with the depth and thickness within the layer to be modified, during the design phase, the 2-dimensional area to be modified may be determined as well to account for, e.g., the footprint of the facility to be constructed. To cover a wide area under the structure(s), the operation may be repeated with overlapping areas of modified soil layer so that a continuous modified soil layer over the area of interest is obtained. The adequacy of the soil layer modification may then be verified by geophysical measurement of the modified site condition to ensure the new shear wave velocity in the modified layer is in the range defined in the design phase.

In an embodiment, to obtain the desired change of impedance between the modified layer and the layer immediately below, the layer-to-be modified may be broken up using the rotating blade or water jet 910 to reduce the shear wave velocity and reflect the wave.

However, in an embodiment, the desired change in impedance may also be obtained by breaking up the layer-to-be modified and injecting a substance that would increase the shear wave velocity through the layer, e.g., cement. Such an increase may also create the change in impedance desired to reflect the wave. For example, if the soil under the site were very loose and the nearest rock layer were very deep, then it may be more economical to break up and inject cement in a relatively shallow soil layer to create the desired impedance change.

Figure 10:
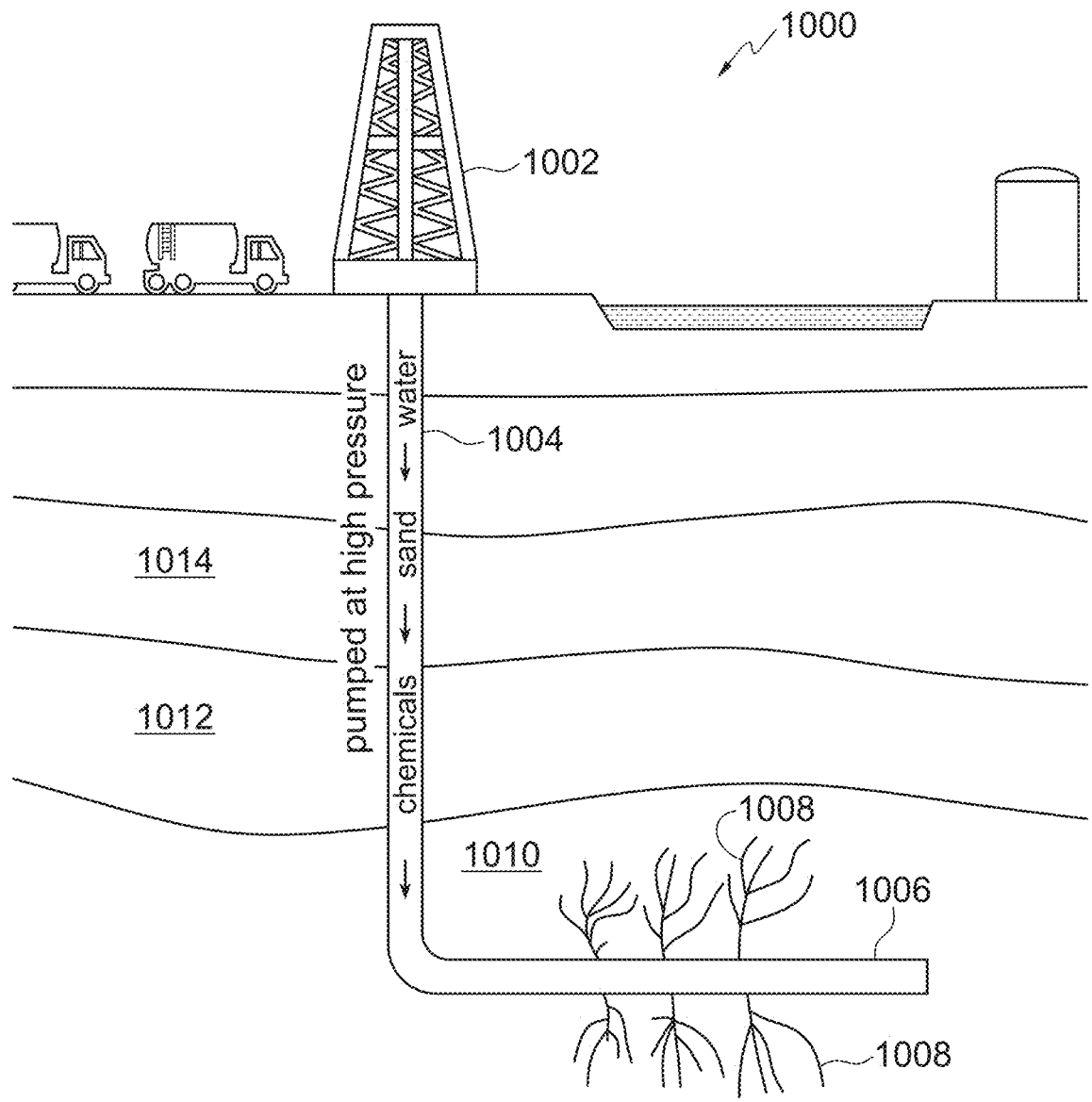
FIG. 10 illustrates a method of ground modification for relatively deep layers.

FIG. 10 illustrates an embodiment of a method of ground modification for relatively deep layers. For most applications of the SSI construction phase, it is anticipated that deep layers in the rock need to be modified. For deep layers, use of probes as described with respect to FIG. 9 may not be practical. However, techniques of horizontal drilling followed by hydraulic fracturing techniques as employed in, e.g., the shale gas industry may be applied in embodiments of the SSI construction phase. In such embodiments, as shown in FIG. 10, a rig 1002 may be used to create a vertical bore 1004 through intervening layers 1014, 1012, to a layer-to-be modified 1010 as determined by the SSI design phase. Subsequently, a horizontal bore 1006 (or a number of horizontal bores in multiple directions) may be created to modify a desired area within layer 1010. Such borings are typically cased and grouted—mainly to protect the ground water from any potential contamination and maintain good contact with the surrounding rock. Once the casing for all the borings are in place, the casing(s) in horizontal boring 1006 are perforated by controlled blasting for the range of interest. Following this perforation step, hydraulic fracturing techniques are used to break up the rock in layer 1010 around the horizontal boring. In this fracturing step, a mix of water and sand and other chemicals is injected under very high-pressure to break up (frack) rock layer 1010, with the sand particles injected in the cracks to keep the cracks open. In the oil/gas industry, fracking is followed by extraction of gas and oil. For application in embodiments of the SSI construction phase, however, there is no need to recover the injected water or any gas or oil. In fact, in an SSI construction phase, target rock layer 1010 and its depth (identified in the SSI design phase) may not be a shale layer with oil and gas.

FIG. 10 illustrates a single horizontal boring, but multiple horizontal borings may be made from one vertical boring to cover a large area of interest consistent with design profile and the lateral dimensions of the modified layer(s) determined from three-dimensional site amplification analysis. There are known techniques available to optimize the distance between the horizontal borings, so the rock volumes fractured from each horizontal boring do not overlap and, thus, perform a more efficient fracking operation. To cover a desired area, vertical bore 1004 may be located at the center of the site, or at a distance from the site. In this process, the change in the site shear wave velocity may be measured concurrently with the fracking operation to ensure the shear wave velocity range established in the design phase is reached. Subsequently, the casing used for the vertical and horizontal boring may be kept in the ground for future use should the geological conditions at the site changes. In an embodiment, the mix of water and sand used for fracking may be enhanced with other materials with high viscosity such as rubber crushed in small particle sizes to increase the damping characteristics of the injected mix in order to reduce seismic response.

Figure 11:
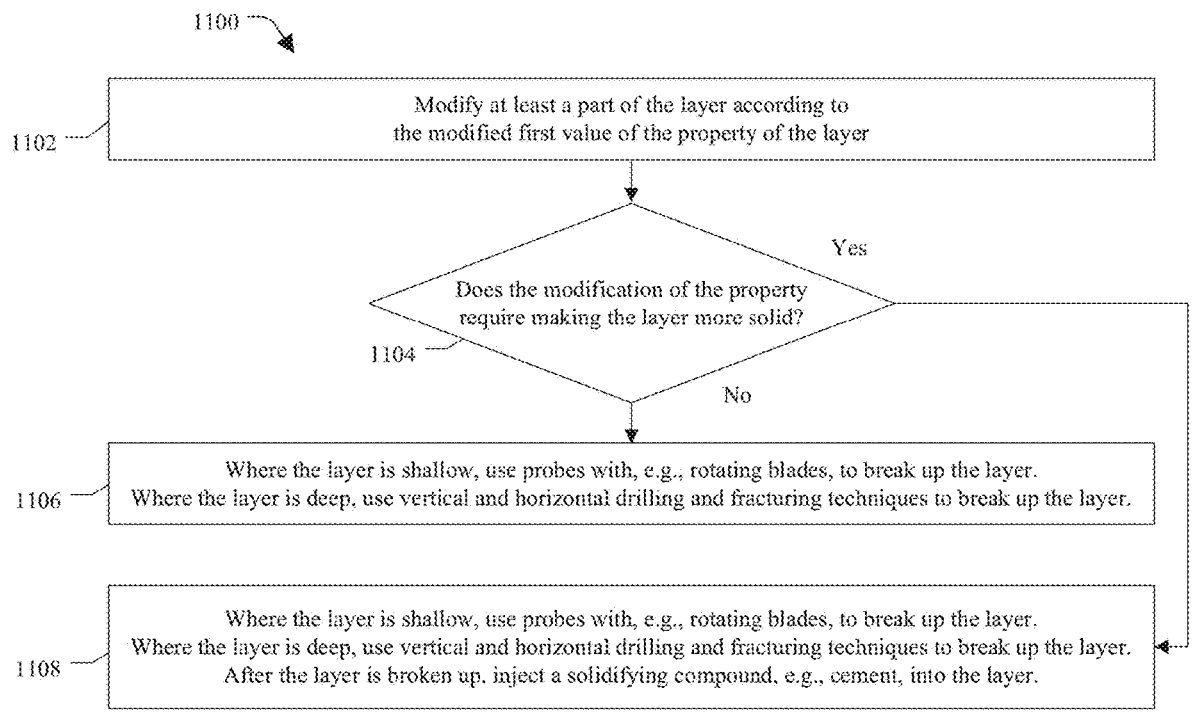
FIG. 11 is a flow diagram of an embodiment for reducing the effect of a seismic event.

FIG. 11 is a flow diagram of an embodiment of a construction method 1100 for reducing the effect of a seismic event. In step 1102, a goal of the method is to modify a layer according to the modified first value of the property of the layer as determined during an embodiment of the SSI design phase. In step 1104, if the modification of the property does not require making the layer more solid, then in step 1106, where the layer is shallow, probes with, e.g., rotating blades, are used to break up the layer. Where the layer is deep, vertical and horizontal drilling and fracturing techniques are used to break up the layer. If the modification of the property requires making the layer more solid, then in step 1108, where the layer is shallow, probes with, e.g., rotating blades, to break up the layer. Where the layer is deep, vertical and horizontal drilling and fracturing techniques are used to break up the layer. After the shallow or deep layer is broken up, a solidifying compound, e.g., cement, is injected into the layer.

Figure 12:
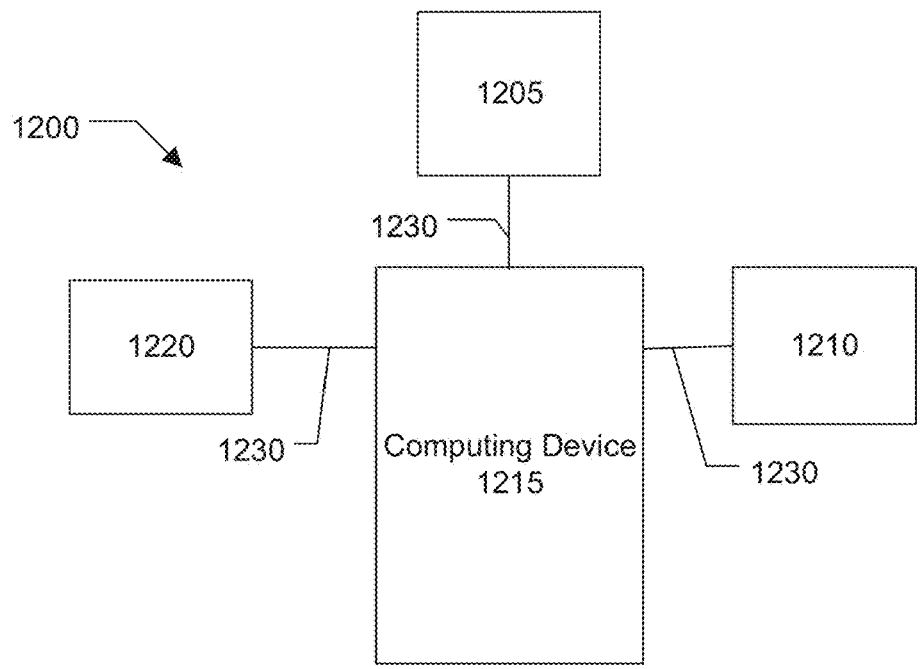
FIG. 12 illustrates a system for implementing an embodiment of the method.

FIG. 12 is a simplified, exemplary block diagram of an embodiment of a system 1200 for use in implementing the steps of the methods according to the various embodiments. System 1200 may also be used to measure ground motion intensity when an earthquake occurs. System 1200 may include a number of sensors for determining site characteristics, e.g., response to an earthquake. The sensors may be accelerometers 1205, 1210, and 1220, which may be distributed about a site. Accelerometers 1205, 1210, and 1220 are in communication with a computing device 1215 via communication links 1230. Accelerometers 1205, 1210, and 1220 may consist of digital three axial accelerometers with ability to store the recorded data and relay the data remotely, e.g., to computing device 1215. Specifications published by, e.g., the American Nuclear Society (ANS), may be used for selection of the accelerometers. It is preferred to have multiple accelerometers at the center and mid span of the treated area and at least one at the distance from the treated area for comparison of the recorded data and evaluation of the effectiveness of the site modification.

Computing device 1215 may include a user interface and software, which may implement the steps of the methods disclosed within. Computing device 1215 may receive data from accelerometers 1205, 1210, and 1220, via communication links 1230, which may be hardwire links, optical links, satellite or other wireless communications links, wave propagation links, or any other mechanisms for communication of information. Various communication protocols may be used to facilitate communication between the various components shown in FIG. 12. Distributed system 1200 in FIG. 12 is merely illustrative of an embodiment and does not limit the scope of the systems and methods as recited in the claims. In an embodiment, the elements of system 1200 are incorporated into a single device. One of ordinary skill in the art would recognize other variations, modifications, and alternatives. For example, more than one computing device 1215 may be employed. As another example, accelerometers 1205, 1210, and 1220 may be coupled to computing device 1215 via a communication network (not shown) or via some other server system.

Computing device 1215 may be responsible for receiving data from accelerometers 1205, 1210, and 1220, performing processing required to implement the steps of the methods, and for interfacing with the user. In some embodiments, computing device 1215 may receive processed data from accelerometers 1205, 1210, and 1220. In some embodiments, the processing required is performed by computing device 1215. In such embodiments, computing device 1215 runs an application for receiving user data, performing the steps of the method, and interacting with the user. In other embodiments, computing device 1215 may be in communication with a server, which performs the required processing, with computing device 1215 being an intermediary in communications between the user and the processing server.

System 1200 enables users to access and query information developed by the disclosed methods. Some example computing devices 1215 include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS®, Android® OS, Google Chrome® OS, Symbian OS®, Windows Mobile® OS, Windows Phone, BlackBerry® OS, Embedded Linux, Tizen, Sailfish, webOS, Palm OS® or Palm Web OS®; or wearable devices such as smart watches, smart fitness or medical bands, and smart glasses.

Figure 13:
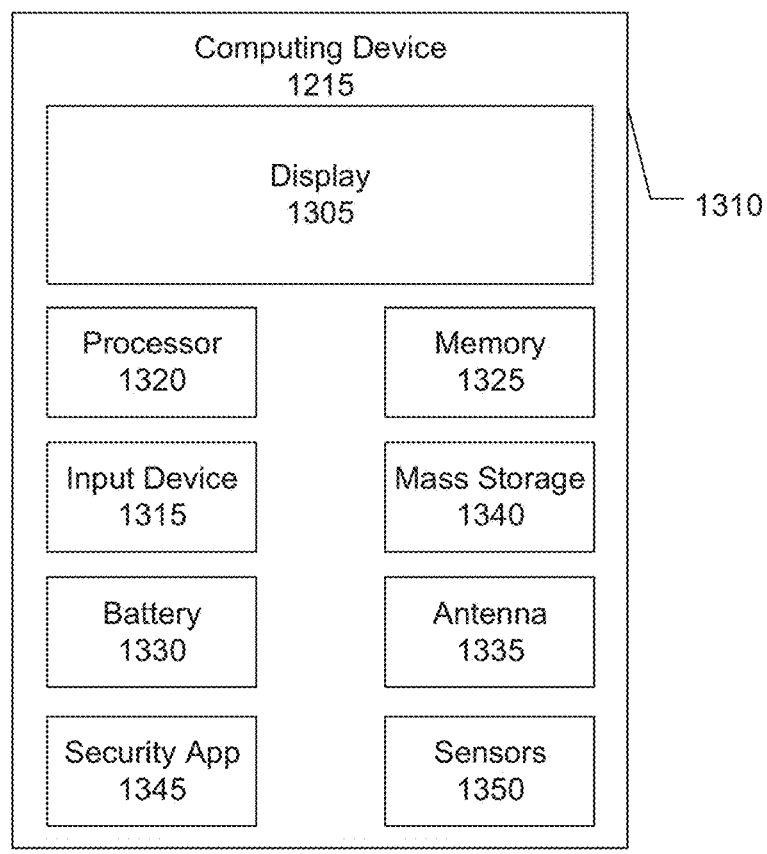
FIG. 13 illustrates aspects of the system of FIG. 12 for implementing an embodiment of the method.

FIG. 13 is an exemplary block diagram of a computing device 1215 from the system of FIG. 12. In an embodiment, a user interfaces with the system through computing device 1215, which also receives data and performs the computational steps of the embodiments. Computing device 1215 may include a display, screen, or monitor 1305, housing 1310, input device 1315, sensors 1350, and a security application 1345. Housing 1310 houses familiar computer components, some of which are not shown, such as a processor 1320, memory 1325, battery 1330, speaker, transceiver, antenna 1335, microphone, ports, jacks, connectors, camera, input/output (I/O) controller, display adapter, network interface, mass storage devices 1340, and the like. In an embodiment, sensors 1350 may include sensors 1205, 1210, and 1220 incorporated into computing device 1215.

Input device 1315 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 1340 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

System 1200 may also be used with computer systems having configurations that are different from computing device 1215, e.g., with additional or fewer subsystems. For example, a computer system could include more than one processor (i.e., a multiprocessor system, which may permit parallel processing of information) or a system may include a cache memory. The computing device 1215 shown in FIG. 13 is but an example of a computer system suitable for use. Other configurations of subsystems suitable for use will be readily apparent to one of ordinary skill in the art. In other specific implementations, computing device 1215 is a tablet computer, a laptop, or a netbook. In another specific implementation, computing device 1215 is a non-portable computing device such as a desktop computer or workstation.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

I claim:

1. A method for reducing seismic motion at a ground surface layer for a site due to a seismic event, comprising:
obtaining a predicted seismic motion for a first layer at a depth beneath the ground layer of a site;
using at least one sensor to obtain data regarding the site, including:
obtaining, for each of a plurality of layers between the ground layer and the first layer, a value of a site property;
computer modeling the site by:
creating a first computer model of the site using the predicted seismic motion and the obtained data;
performing, using the first computer model and the predicted seismic motion, a first site amplification analysis to obtain a first modeled response at the ground layer of the site;
determining a preferred layer to physically modify by:
obtaining, for each individual layer of the plurality of layers, a modified model response at the ground layer by:
modifying the obtained value of the site property for an individual layer to be higher or lower than the obtained value of the site property for a next layer closer to the ground layer;
creating, using the modified value of the site property for the individual layer and the obtained values of the site property for all other layers, a modified computer model: and
performing, using the modified computer model and the predicted seismic motion, a site amplification analysis to obtain a modified model response at the ground layer;
comparing the plurality of modified model responses to the first modeled response to determine a preferred modified modeled response that provides a reduction in a modeled response spectrum or in a modeled shear stress: and
selecting the individual layer associated with the preferred modified modeled response as the preferred laver;
and
physically modifying at least a part of the preferred layer of the site to change the value of the site property of the preferred layer from the obtained value to the modified value of the site property used in the preferred modified modeled response.

2. The method of claim 1, wherein the obtained values of the site property are in situ values.

3. The method of claim 1, wherein:
the site property includes a shear wave velocity; and
the modified value of the site propel ty includes a modified shear wave velocity.

4. The method of claim 1, wherein the modification of the obtained value of the site property causes the modified value to be either: less than or equal to half of the site property for the next layer closer to the ground layer, or greater than or equal to twice the second value of the site property for the next layer closer to the ground layer.

5. The method of claim 1, wherein physically modifying at least a part of the preferred layer of the site to change the value of the site property of the preferred layer from the obtained value to the modified value includes:
fracking a section of the second layer below the site.

6. The method of claim 5 further comprising:
performing further modeling to determine the lateral dimensions of the modifications to the preferred layer.

7. The method of claim 1, further comprising:
obtaining, for each individual layer of the plurality of layers except the preferred layer, a second preferred modified modeled response at the ground layer by:
modifying the obtained value of the site property for the individual layer to be higher or lower than the obtained value of the site property for a next layer closer to the ground layer;
creating, using the modified value of the site property for the individual layer, the modified value of the site property for the preferred layer associated with the preferred modified modeled response, and the obtained values of the site property for all other layers, a second modified computer model; and
performing, using the second modified computer model and the predicted seismic motion, a site amplification analysis to obtain a second modified model response at the ground layer;
comparing the plurality of second modified model responses to determine a second preferred modified model response that provides a reduction in a modeled response spectrum or in a modeled shear stress; and
selecting the individual layer associated with the preferred modified modeled response as the second preferred layer: and
physically modifying at least a part of the second preferred layer to change value of the site property of the second preferred layer from the obtained value to the modified value of the site property used in the second preferred modified modeled response.

8. The method of claim 1 further comprising, in the creating a first computer model of the site using the predicted seismic motion and the obtained data:
dividing a layer of the plurality of layers into at least two sublayers and replacing the divided layer with the at least two sublayers in the plurality of layers such that the at least two sublayers are treated as individual layers in the creating a first computer model and in the determining the preferred layer to physically modify.

9. The method of claim 8, wherein the preferred layer is one of the at least two sublayers.

10. A non-transitory computer-readable medium encoded with a plurality of instructions which, when executed by at least one processor, cause the at least one processor to perform steps for reducing motion at a ground layer of a site due to a seismic event comprising:
obtaining a predicted seismic motion for a first layer at a depth beneath the ground layer of a site;
using at least one sensor to obtain data regarding the site, including:
obtaining, for each of a plurality of layers between the ground layer and the first layer, a value of a site property;
computer modeling the site by:
creating a first computer model of the site using the predicted seismic motion and the obtained data;
performing, using the first computer model and the predicted seismic motion, a first site amplification analysis to obtain a first modeled response at the ground layer of the site;

determining a preferred layer to physically modify by:
obtaining, for each individual layer of the plurality of layers, a modified model response at the ground layer by:
modifying the obtained value of the site property for an individual layer to be higher or lower than the obtained value of the site property for a next layer closer to the ground layer:
creating, using the modified value of the site property for the individual layer and the obtained values of the site property for all other layers, a modified computer model: and
performing, using the modified computer model and the predicted seismic motion, a site amplification analysis to obtain a modified model response at the ground layer;
comparing the plurality of modified model responses to the first modeled response to determine a preferred modified modeled response that provides a reduction in a modeled response spectrum or in a modeled shear stress; and
selecting the individual layer associated with the preferred modified modeled response as the preferred layer;
the selection of the preferred layer providing direction to physically modify at least a part of the preferred layer of the site to change the value of the site property of the preferred layer from the obtained value to the modified value of the site property used in the preferred modified modeled response.

11. The non-transitory computer-readable medium of claim 10, wherein:
the site property includes a shear wave velocity;
the modified value of the site property includes a modified shear wave velocity; and
the modification of the obtained value of the site property causes the modified value to be either: less than or equal to half of the site property for the next layer closer to the ground layer, or greater than or equal to twice the second value of the site property for the next layer closer to the ground layer.

12. The non-transitory computer-readable medium of claim 10, the steps further comprising:
obtaining, for each individual layer of the plurality of layers except the preferred layer, a second preferred modified modeled response at the ground layer by:
modifying the obtained value of the site property for the individual layer to be higher or lower than the obtained value of the site property for a next layer closer to the ground layer;
creating, using the modified value of the site property for the individual layer, the modified value of the site property for the preferred layer associated with the preferred modified modeled response, and the obtained values of the site property for all other layers, a second modified computer model; and
performing, using the second modified computer model and the predicted seismic motion, a site amplification analysis to obtain a second modified model response at the ground layer;
comparing the plurality of second modified model responses to determine a second preferred modified model response that provides a reduction in a modeled response spectrum or in a modeled shear stress; and
selecting the individual layer associated with the preferred modified modeled response as the second preferred layer; and
physically modifying at least a part of the second preferred layer to change value of the site property of the second preferred layer from the obtained value to the modified value of the site property used in the second preferred modified modeled response.

13. The non-transitory computer-readable medium of claim 10, the steps further comprising, in the creating a first computer model of the site using the predicted seismic motion and the obtained data:
dividing a layer of the plurality of layers into at least two sublayers and replacing the divided layer with the at least two sublayers in the plurality of layers such that the at least two sublayers are treated as individual layers in the creating a first computer model and in the determining the preferred layer to physically modify, where the preferred layer is one of the at least two sublayers.

14. A system comprising at least one processor and storage with instructions, the instructions when executed by the processor cause the system to perform steps of a method for reducing motion at a ground layer of a site due to a seismic event comprising:
obtaining a predicted seismic motion for a first layer at a depth beneath the ground layer of a site;
using at least one sensor to obtain data regarding the site, including:
obtaining, for each of a plurality of layers between the ground layer and the first layer, a value of a site property;
computer modeling the site by:
creating a first computer model of the site using the predicted seismic motion and the obtained data;
performing, using the first computer model and the predicted seismic motion, a first site amplification analysis to obtain a first modeled response at the ground layer of the site;
determining a preferred layer to physically modify by:
obtaining, for each individual layer of the plurality of layers, a modified model response at the ground layer by:
modifying the obtained value of the site property for an individual layer to be higher or lower than the obtained value of the site property for a next layer closer to the ground layer
creating, using the modified value of the site property for the individual layer and the obtained values of the site property for all other layers, a modified computer model; and
performing, using the modified computer model and the predicted seismic motion, a site amplification analysis to obtain a modified model response at the ground layer;
comparing the plurality of modified model responses to the first modeled response to determine a preferred modified modeled response that provides a reduction in a modeled response spectrum or in a modeled shear stress, and
selecting the individual layer associated with the preferred modified modeled response as the preferred layer,
the selection of the preferred layer providing direction to physically modify at least a part of the preferred layer of the site to change the value of the site property of the preferred layer from the obtained value to the modified value of the site property used in the preferred modified modeled response.

15. The system of claim 14, wherein:
the site property includes a shear wave velocity; and
the modified value of the site property includes a modified shear wave velocity.

16. The system of claim 14, wherein the modification of the obtained value of the site property causes the modified value to be either: less than or equal to half of the site property for the next layer closer to the ground layer, or greater than or equal to twice the second value of the site property for the next layer closer to the ground layer.

17. The system of claim 14, wherein physically modifying at least a part of the preferred layer of the site to change the value of the site property of the preferred layer from the obtained value to the modified value includes:
finking a section of the second layer below the site.

18. The system of claim 14, the steps further comprising:
performing further modeling to determine the lateral dimensions of the modifications to the preferred layer.

19. The system of claim 14, the steps further comprising:
obtaining, for each individual layer of the plurality of layers except the preferred layer, a second preferred modified modeled response at the ground layer by:
modifying the obtained value of the site property for the individual layer to be higher or lower than the obtained value of the site property for a next layer closer to the ground layer;
creating, using the modified value of the site property for the individual layer, the modified value of the site property for the preferred layer associated with the preferred modified modeled response, and the obtained values of the site property for all other layers, a second modified computer model; and
performing, using the second modified computer model and the predicted seismic motion, a site amplification analysis to obtain a second modified model response at the ground layer;
comparing the plurality of second modified model responses to determine a second preferred modified model response that provides a reduction in a modeled response spectrum or in a modeled shear stress; and
selecting the individual layer associated with the preferred modified modeled response as the second preferred layer; and
physically modifying at least a part of the second preferred layer to change value of the site property of the second preferred layer from the obtained value to the modified value of the site property used in the second preferred modified modeled response.

20. The system of claim 14, the steps further comprising, in the creating a first computer model of the site using the predicted seismic motion and the obtained data
dividing a layer of the plurality of layers into at least two sublayers and replacing the divided layer with the at least two sublayers in the plurality of layers such that the at least two sublayers are treated as individual layers in the creating a first computer model and in the determining the preferred layer to physically modify.

21. The system of claim 20, wherein the preferred layer is one of the at least two sublayers.

* * * * *